(12) United States Patent
Schowengerdt et al.

(10) Patent No.: US 11,442,227 B2
(45) Date of Patent: Sep. 13, 2022

(54) METHODS AND SYSTEMS FOR FABRICATION OF SHAPED FIBER ELEMENTS FOR SCANNING FIBER DISPLAYS

(71) Applicant: Magic Leap, Inc., Plantation, FL (US)

(72) Inventors: Brian T. Schowengerdt, Seattle, WA (US); Mathew D. Watson, Bellevue, WA (US); Charles David Melville, Camano Island, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/076,510

(22) Filed: Oct. 21, 2020

(65) Prior Publication Data

US 2021/0124120 A1 Apr. 29, 2021

Related U.S. Application Data

(63) Continuation of application No. 16/286,498, filed on Feb. 26, 2019, now Pat. No. 10,845,543, which is a
(Continued)

(51) Int. Cl.
*G02B 6/26* (2006.01)
*C03C 25/68* (2006.01)
(Continued)

(52) U.S. Cl.
CPC .............. *G02B 6/262* (2013.01); *C03C 25/68* (2013.01); *G02B 6/255* (2013.01); *G02B 26/103* (2013.01)

(58) Field of Classification Search
CPC ........ G02B 6/262; G02B 6/255; G02B 6/103; C03C 25/68
(Continued)

(56) References Cited

U.S. PATENT DOCUMENTS 4,944,567 A 7/1990 Kuper et al.
5,135,295 A 8/1992 Jen et al.
(Continued)

FOREIGN PATENT DOCUMENTS

AU 2017382871 6/2019
CA 3046224 6/2018
(Continued)

OTHER PUBLICATIONS

Chinese Application No. 201780079443.6, Office Action dated May 6, 2021, 14 pages (9 pages of Original Document and 5 pages of English Translation).
(Continued)

*Primary Examiner* — Jerry M Blevins
(74) *Attorney, Agent, or Firm* — Kilpatrick Townsend & Stockton LLP

(57) ABSTRACT

A fiber optic element of a fiber scanning system includes a motion actuator having longitudinal side members, an internal orifice, a first support region, a central region, and a second support region. The fiber optic element also includes a first fiber optic cable passing through the internal orifice and having a first fiber joint as well as a second fiber optic cable passing through the internal orifice. The second fiber optic cable has a second fiber joint disposed in the central region and spliced to the first fiber joint, a second coupling region, a light delivery region, and a light emission tip. The light delivery region is characterized by a first diameter and the light emission tip is characterized by a second diameter less than the first diameter.

13 Claims, 19 Drawing Sheets

Related U.S. Application Data continuation of application No. 15/851,005, filed on Dec. 21, 2017, now Pat. No. 10,254,483.

(60) Provisional application No. 62/438,380, filed on Dec. 22, 2016.

(51) Int. Cl.
*G02B 6/255* (2006.01)
*G02B 26/10* (2006.01)

(58) Field of Classification Search
USPC .......................................................... 385/43
See application file for complete search history.

(56) References Cited

U.S. PATENT DOCUMENTS

| | | | |
|---|---|---|---|
| 7,986,861 | B2 | 7/2011 | Shimotsu |
| 10,254,483 | B2 | 4/2019 | Schowengerdt et al. |
| 10,845,543 | B2 | 11/2020 | Schowengerdt et al. |
| 2001/0052930 | A1 | 12/2001 | Adair et al. |
| 2002/0025099 | A1 | 2/2002 | Williams et al. |
| 2002/0064341 | A1* | 5/2002 | Fauver .................. G02B 6/245 |
| | | | 385/25 |
| 2004/0122328 | A1 | 6/2004 | Wang et al. |
| 2004/0151466 | A1 | 8/2004 | Crossman-Bosworth et al. |
| 2005/0111797 | A1 | 5/2005 | Sherrer et al. |
| 2006/0275019 | A1 | 12/2006 | Papautsky et al. |
| 2008/0039693 | A1 | 2/2008 | Karasawa |
| 2008/0249369 | A1* | 10/2008 | Seibel .................. G02B 23/26 |
| | | | 600/182 |
| 2010/0322560 | A1 | 12/2010 | Granestrand et al. |
| 2013/0028557 | A1 | 1/2013 | Lee et al. |
| 2014/0232993 | A1 | 8/2014 | Kim |
| 2018/0180812 | A1 | 6/2018 | Schowengerdt et al. |
| 2019/0310419 | A1 | 10/2019 | Schowengerdt et al. |

FOREIGN PATENT DOCUMENTS

| | | |
|---|---|---|
| CN | 101776796 | 7/2010 |
| CN | 104101737 | 10/2014 |
| CN | 104956251 A | 9/2015 |
| CN | 105050474 | 11/2015 |
| CN | 106028906 | 10/2016 |
| CN | 110113980 | 8/2019 |
| EP | 3558087 | 10/2019 |
| EP | 3558087 | 1/2020 |
| IN | 201947020491 | 6/2019 |
| JP | 3287236 A | 6/2002 |
| JP | 2003535659 A | 12/2003 |
| JP | 2008043763 A | 2/2008 |
| JP | 2010162089 A | 7/2010 |
| JP | 2011050667 A | 3/2011 |
| JP | 2014145937 A | 8/2014 |
| JP | 2016009121 A | 1/2016 |
| JP | 2020503548 | 1/2020 |
| KR | 101346351 B1 | 12/2013 |
| KR | 20190094448 | 8/2019 |
| WO | 2018119267 | 6/2018 |

OTHER PUBLICATIONS

European Application No. 17882549.3, Office Action dated Mar. 3, 2021, 7 pages.

IN201947020491, "First Examination Report", dated Dec. 21, 2021, 6 pages.

Application No. JP2019-533215, English Translation and Office Action, dated Oct. 29, 2021, 4 pages.

U.S. Appl. No. 15/851,005, "Non-Final Office Action", dated Jun. 29, 2018, 8 pages.

U.S. Appl. No. 15/851,005, "Notice of Allowance", dated Nov. 28, 2018, 5 pages.

U.S. Appl. No. 16/286,498, "Non-Final Office Action", dated Jan. 3, 2020, 11 pages.

U.S. Appl. No. 16/286,498, "Notice of Allowance", dated Jul. 23, 2020, 8 pages.

EP17882549.3, "Extended European Search Report", dated Dec. 2, 2019, 12 pages.

Fauver, et al., "Microfabrication of Fiber Optic Scanners", Proceedings of SPIE—The International Society for Optical Engineering, vol. 4773, Jul. 9, 2002, pp. 102-110.

PCT/US2017/067954, "International Preliminary Report on Patentability", dated Jul. 4, 2019, 8 pages.

PCT/US2017/067954, "International Search Report and Written Opinion", dated May 15, 2018, 11 pages.

PCT/US2017/067954, "Invitation to Pay Additional Fees and, Where Applicable, Protest Fee", dated Mar. 12, 2018, 2 pages.

Wang, et al., "2-D Mechanically Resonating Fiberoptic Scanning Display System", 2010 International Symposium on Optomechatronic Technologies, Oct. 2010, 6 pages.

Application No. AU2017382871, "First Examination Report", dated Jul. 18, 2022, 4 pages.

Application No. IL267395, "Office Action", dated May 24, 2022, 4 pages.

Application No. EP 17882549.3, "Notice of Allowance", dated Jul. 7, 2022, 9 pages.

\* cited by examiner

METHODS AND SYSTEMS FOR FABRICATION OF SHAPED FIBER ELEMENTS FOR SCANNING FIBER DISPLAYS

CROSS-REFERENCES TO RELATED APPLICATIONS

This application is a continuation of U.S. patent application Ser. No. 16/286,498 filed on Feb. 26, 2019, now U.S. Pat. No. 10,845,543, issued on Nov. 24, 2020, entitled "METHODS AND SYSTEMS FOR FABRICATION OF SHAPED FIBER ELEMENTS FOR SCANNING FIBER DISPLAYS," which is a continuation of U.S. patent application Ser. No. 15/851,005 filed on Dec. 21, 2017, now U.S. Pat. No. 10,254,483 issued on Apr. 9, 2019, entitled "SHAPED FIBER ELEMENTS FOR SCANNING FIBER DISPLAYS," which claims the benefit of and priority to U.S. Provisional Patent Application No. 62/438,380 filed on Dec. 22, 2016, entitled "METHODS AND SYSTEMS FOR FABRICATION OF SHAPED FIBER ELEMENTS FOR SCANNING FIBER DISPLAYS," the disclosures of which are hereby incorporated by reference in their entirety for all purposes.

This application incorporates by reference in their entirety each of the following U.S. patent applications: U.S. patent application Ser. No. 15/851,049 filed on Dec. 21, 2017, now U.S. Pat. No. 10,723,653 issued on Jul. 28, 2020, entitled "METHODS AND SYSTEMS FOR FABRICATION OF SHAPED FIBER ELEMENTS USING LASER ABLATION;" and U.S. patent application Ser. No. 15/851,317 filed on Dec. 21, 2017, now U.S. Pat. No. 10,437,048 issued on Oct. 8, 2019, entitled "METHODS AND SYSTEMS FOR MULTI-ELEMENT LINKAGE FOR FIBER SCANNING DISPLAY."

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems for fabrication of shaped fiber optic cables. More particularly, embodiments of the present invention provide methods and systems for fabricating fibers with tapered and other predetermined profiles. The invention is applicable to a variety of applications in computer vision and image display systems.

According to an embodiment of the present invention, a fiber optic element of a fiber scanning system is provided. The fiber optic scanning system can include multiple fiber optic elements. The fiber optic element includes a motion actuator (e.g., a piezoelectric actuator) having longitudinal side members, an internal orifice disposed between the longitudinal side members, a support region disposed at one end of the motion actuator, and a projection region opposing the support region. The longitudinal side members can include a first piezoelectric element operable to contract/expand and a second piezoelectric element operable to expand/contract in opposition to the first piezoelectric element. The internal orifice is characterized in some embodiments by a cylindrical profile defined by an internal diameter. In this embodiment, the coupling region can be substantially cylindrical and defined by an outer diameter substantially equal to the internal diameter.

The fiber optic elements also includes a fiber optic cable passing through the internal orifice. The fiber optic cable has a coupling region disposed between the longitudinal side members and in mechanical contact with the projection region, a light delivery region extending away from the projection region of the motion actuator, and a light emission tip. The fiber optic element can also include an interface layer (e.g., glass frit or epoxy) disposed between the coupling region and the projection region. The light delivery region is characterized by a first diameter and the light emission tip is characterized by a second diameter less than the first diameter. In an embodiment, the light delivery region is characterized by a reentrant profile extending between the projection region of the motion actuator. As an example, the fiber optic cable can be tapered from the light deliver region to the light emission tip. The fiber scanning system can be an element of a fiber scanning projection display.

In an embodiment, the coupling region can include a support portion in mechanical contact with the longitudinal side members and a flexure region disposed between the support region and the projection region. The flexure region is separated from the longitudinal side members by a flexure distance. In this embodiment, the coupling region further includes a second support portion in mechanical contact with the longitudinal side members. The second support portion can be disposed in the support region.

According to another embodiment of the present invention, a fiber optic element of a fiber scanning system is provided. The fiber optic element includes a motion actuator having longitudinal side members, an internal orifice disposed between the longitudinal side members, a first support region disposed at one end of the motion actuator, a central region, and a second support region disposed at an opposing end of the motion actuator. A first fiber optic cable passes through the internal orifice. The first fiber optic cable has a first coupling region disposed between the longitudinal side members and a first fiber joint disposed in the central region. A second fiber optic cable passes through the internal orifice. The second fiber optic cable has a second fiber joint disposed in the central region and spliced to the first fiber joint and a second coupling region disposed between the longitudinal side members and in mechanical contact with the second support region. The fiber optic elements also includes a light delivery region extending away from the second support region of the motion actuator and a light emission tip. the light delivery region is characterized by a first diameter and the light emission tip is characterized by a second diameter less than the first diameter.

According to a specific embodiment of the present invention, a fiber optic element of a fiber scanning system is provided. The fiber optic element includes a motion actuator having longitudinal side members, an internal orifice disposed between the longitudinal side members, a first support region disposed at one end of the motion actuator, a central region, and a second support region disposed at an opposing end of the motion actuator. The fiber optic element also includes a retaining element disposed in the first support region and a first optical waveguide passing through the retaining element and the internal orifice. The first optical waveguide has a first mating joint disposed in the retaining element. The fiber optic element further includes a second optical waveguide passing through the internal orifice. The second optical waveguide has a second mating joint disposed in the retaining element and joined to the first mating joint and a second coupling region disposed between the longitudinal side members and in mechanical contact with the second support region. The fiber optic elements additionally includes a light delivery region extending away from the second support region of the motion actuator and a light emission tip. The light delivery region is characterized by a first diameter and the light emission tip is characterized by a second diameter less than the first diameter.

According to another specific embodiment of the present invention, a method of fabricating a shaped fiber is provided. The method includes providing a fiber optic cable, covering a portion of the fiber optic cable with an etch jacket to define an exposed region of the fiber optic cable and a covered region of the fiber optic cable, and exposing the exposed region of the fiber optic cable and the etch jacket to an etchant solution. The method also includes removing at least a portion of the exposed region of the fiber optic cable in response to exposure to the etchant solution and wicking the etchant solution under the etch jacket to remove at least a portion of the covered region of the fiber optic cable. Wicking the etchant solution under the etch jacket can include capillary flow of the etchant solution.

According to a particular embodiment of the present invention, a fiber actuator mechanism is provided. The fiber actuator includes a motion actuator having longitudinal side members, an internal orifice disposed between the longitudinal side members, a support region disposed at one end of the motion actuator, and a projection region opposing the support region and having a projection face. The fiber actuator also includes a fiber optic cable passing through the internal orifice. The fiber optic cable has a coupling region disposed between the longitudinal side members and in mechanical contact with the projection region and a light delivery region extending away from the projection region of the motion actuator. The light delivery region includes a flange extending along the projection face of the projection region. The fiber optic cable further includes a light emission tip. The light delivery region can further include a tapered region extending longitudinally away from the projection face of the projection region. As an example, a slope associated with the tapered region decreases with distance from the flange.

According to an embodiment of the present invention, a fiber actuator mechanism is provided. The fiber actuator mechanism includes a motion actuator having longitudinal side members, an internal orifice disposed between the longitudinal side members, a support region disposed at one end of the motion actuator, and a projection region opposing the support region and having a projection face and a projection exterior surface. The fiber actuator mechanism also includes a fiber optic cable passing through the internal orifice. The fiber optic cable has a coupling region disposed between the longitudinal side members and in mechanical contact with the projection region and a light delivery region surrounding and extending away from the projection region of the motion actuator. The light delivery region includes a first region parallel to the projection face and a second region parallel to the projection exterior surface. The fiber actuator mechanism further includes a light emission tip. The first region can be in mechanical contact with the projection face. In an embodiment, the second region is in mechanical contact with the projection exterior surface. Moreover, the light delivery region can further include a third region surrounding the projection region.

According to another embodiment of the present invention, a method of fabricating a shaped fiber is provided. The method includes providing a fiber optic cable having a support region and an emission region, providing an etch solution (e.g., including hydrofluoric acid), and coating at least a portion of the emission with an etch resistant mask. The method further includes inserting the support region into the etch solution, etching a central portion of the support region, and removing the coating on the emission region. Etching the central portion of the support region can result in the formation of a flexure region. The method also includes inserting the emission region into the etch solution and etching the emission region. Etching the emission region can include withdrawing the emission region from the etch solution at a decreasing rate (e.g., a nonlinear rate) as a function of time. The etch system can also include an inert solution (e.g., isooctane) adjacent the etchant solution, for example, floating on the etchant solution. The method can also include coating the etched central portion before etching the emission region.

According to a specific embodiment of the present invention, a method of fabricating an etched fiber waveguide is provided. The method includes providing an etchant system including an etchant solution (e.g. including HF), inserting a first end of a fiber optic cable into the etchant solution, and withdrawing the first end of the fiber optic cable at a first rate. The first rate can vary (e.g., decrease) as a function of time in a linear or nonlinear manner. The method also includes inserting a second end of the fiber optic cable opposing the first end into the etchant solution and withdrawing the second end of the fiber optic cable at a second rate. The second rate can vary (e.g., decrease) as a function of time in a linear or nonlinear manner. The etch system can also include an inert solution (e.g., isooctane) adjacent the etchant solution, for example, floating on the etchant solution. In some embodiments, a central portion of the fiber optic cable disposed between the first end and the second end is not etched.

According to another specific embodiment of the present invention, a method of fabricating a shaped fiber is provided. The method includes providing a fiber optic cable having a support region and an emission region and providing an etch solution including a first inert layer, an etch layer adjacent the first inert layer, and a second inert layer adjacent the etch layer. The method also includes coating at least a portion of the emission region with an etch resistant mask, inserting the support region into the etch layer, and etching a central portion of the support region to form a flexure region disposed between sections of the support region and characterized by a thinner diameter than the sections of the support region. The method further includes removing the coating on at least a portion of the emission region, inserting the emission region into the etch layer, and etching the emission region to form a tapered profile. The first inert layer can include isooctane and the etch layer can include HF acid. The second inert layer can include an oil with a density higher than a density of an etchant in the etch layer.

According to a particular embodiment of the present invention, a method of fabricating a tapered fiber emission tip is provided. The method includes providing a fiber optic cable having an emission region, providing an etch solution including an inert layer and an etch layer. and inserting the emission region through the inert layer into the etch layer. The method also includes etching a portion of the emission region, introducing agitation between the emission region and the etch solution, and withdrawing the emission region from the etch layer. In some embodiments, introducing agitation includes both agitation of the etch solution and agitation of the fiber optic cable. Withdrawing the emission region from the etch layer can be characterized by an increasing rate as a function of time.

According to another particular embodiment of the present invention, a method of fabricating a tapered fiber emission tip is provided. The method includes providing a fiber optic cable having an emission region, providing an etch solution including an inert layer and an etch layer and inserting the emission region through the inert layer to a first depth in the etch layer. The method also includes etching a portion of the emission region, at least partially withdrawing the emission region from the etch layer, and re-inserting the emission region through the inert layer to a subsequent depth in the etch layer less than the first depth. The method further includes repeating at least partially withdrawing the emission region and re-inserting the emission region and completely withdrawing the emission region from the etch layer. The subsequent depth can be gradually decreased during the repeating process.

According to an embodiment of the present invention, a method of fabricating a tapered fiber emission tip is provided. The method includes providing a fiber optic cable having an emission region and an emission face, coating the emission region with an etch resistant mask, and exposing a portion of the emission region adjacent the emission face to form a sidewall mask and an emission face mask. The method also includes providing an etch solution, inserting the emission region into the etch solution, and etching a portion of the emission region to form successively deeper etch profiles. The method further includes determining an etch endpoint and removing the emission region from the etch solution. Determining an etch endpoint can include detecting separation between the emission face and the emission face mask.

According to a particular embodiment of the present invention, a method of fabricating a lens on an optical fiber tip is provided. The method includes providing a fiber optic cable having an emission region and an emission face, providing an etch solution having a surface, and positioning the emission face to make contact with the surface of the etch solution. The method also includes forming a meniscus of the etch solution surrounding the emission region. The meniscus is characterized by a greater width adjacent the emission face and an initial height.

The method further includes etching the emission region to form an initial etch profile, decreasing the height of the meniscus, and etching the emission region to form a subsequent etch profile. Etching the emission region to form the subsequent etch profile can be a self-limiting process.

According to a specific embodiment of the present invention, a waveguide fabrication system is provided. The waveguide fabrication system includes a robot, an etch system coupled to the robot, and a cleaning system coupled to the robot. The waveguide fabrication system also includes a mask formation system coupled to the robot, a mask removal system coupled to the robot, and a computer coupled to the robot. The waveguide fabrication system can further include an input/output stack coupled to the robot.

Numerous benefits are achieved by way of the present invention over conventional techniques. For example, embodiments of the present invention provide methods and systems that can be used to fabricate fibers that can be integrated into fiber scanning display systems. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems for fabricating elements for fiber scanning display systems. In some fiber scanner systems, the diameter of the fiber optic cable is significantly narrower than the inner diameter of the piezoelectric actuator that holds the fiber. In these systems, a bonding material is utilized to fill the resulting gap. As an example, an epoxy can be used to join the fiber to the piezoelectric actuator. Since the stiffness of epoxy can vary with temperature, the epoxy joint can impact fiber performance. Moreover, adhesion problems can degrade fiber performance.

Figure 1A:
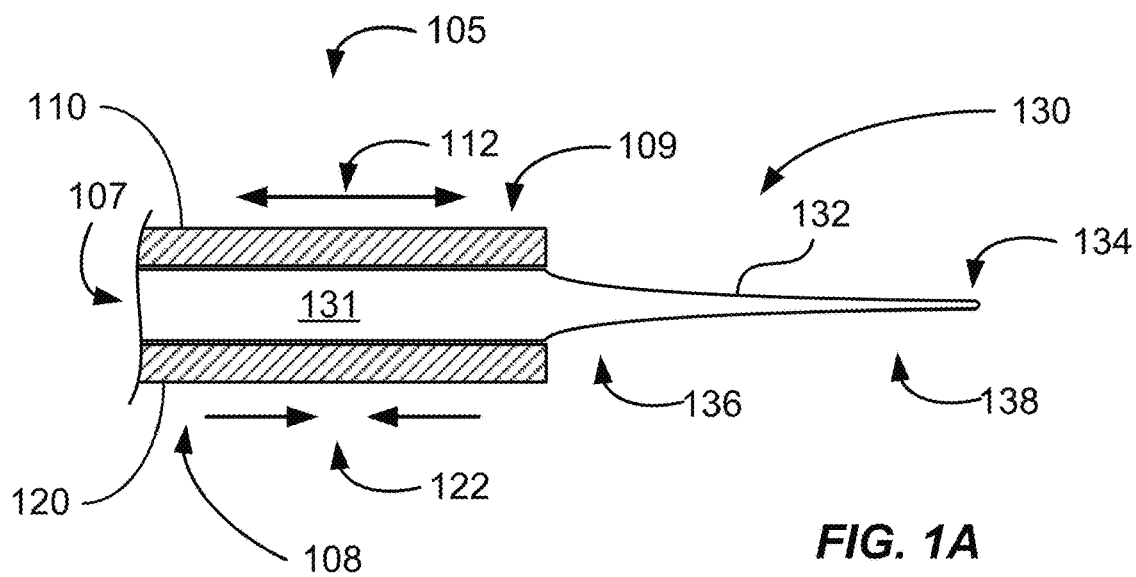
FIG. 1A is a simplified side view illustrating a shaped fiber of a fiber scanning system according to an embodiment of the present invention.

FIG. 1A is a simplified side view illustrating a shaped fiber of a fiber scanning system according to an embodiment of the present invention. Referring to FIG. 1A, the motion actuator utilizes a piezoelectric structure or actuator and actuation of the piezoelectric structure is illustrated by a first longitudinal side member 110 expanding or distending as illustrated by arrows 112 while a second longitudinal side member 120 opposing the first longitudinal side member 110 is contracting as illustrated by arrows 122. As series of opposing expansion and contraction motions will oscillate the tapered fiber 130 in the plane of the figure. The tapered fiber tapers from a width of about 200-250 µm at the right end of the motion actuator to a width of about 20 µm-40 µm at the fiber tip 132, also referred to as a light emission tip.

The fiber optic element illustrated in FIG. 1A can be part of a fiber scanning projection display system. The fiber optic element includes a motion actuator including opposing longitudinal side members 112 and 122. As the opposing longitudinal side members contract/expand, the fiber optic cable passing between the longitudinal side members oscillates in the plane of the figure. Although a single fiber is illustrated in FIG. 1A and other figures herein, the scope of the present invention includes multi-core fiber systems in which multiple fiber cores are utilized in a scanning display system. One of ordinary skill in the art would recognize many variations, modifications, and alternatives.

In the embodiment illustrated in FIG. 1A, the motion actuator 105 includes an internal orifice 107 disposed between the longitudinal side members 112 and 122. The motion actuator can be defined such that a support region 108 is disposed at one end (e.g., the left end) of the motion actuator and a projection region 109 is disposed at opposing end (e.g. the right end) of the motion actuator opposite to the support region.

A fiber optic cable 130 passes through the internal orifice 107. The fiber optic cable 130 has a coupling region 131 disposed between the longitudinal side members and in mechanical contact with the projection region 109. In the embodiment illustrated in FIG. 1A, the internal orifice of the motion actuator is characterized by a cylindrical profile defined by an internal diameter and the fiber optic cable 130 has a coupling region 131 that is substantially cylindrical and defined by an outer diameter substantially equal to the internal diameter of the motion actuator. The fiber optic cable, as a result, completely fills the motion actuator barrel to provide a rugged mechanical connection and can be a press-fit member in some embodiments. In the embodiment illustrated in FIG. 1A, the materials of the motion actuator, i.e., the piezoelectric material, and the fiber optic cable, e.g., glass, are in direct mechanical contact because of the substantially matched sizes.

Figure 1B:
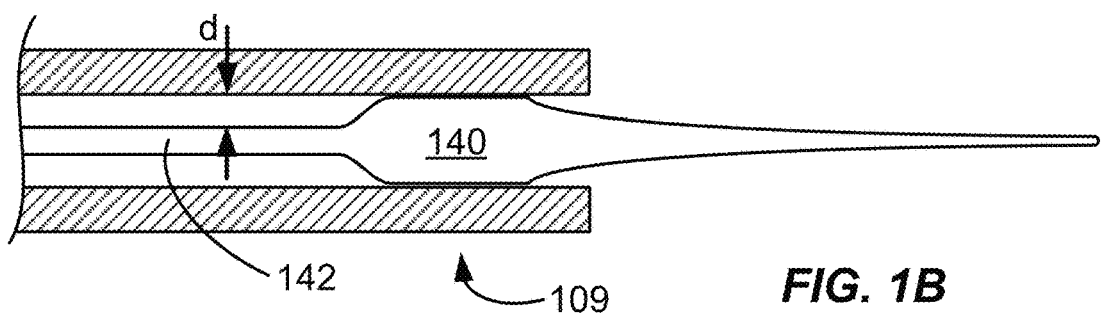
FIG. 1B is a simplified side view illustrating a shaped fiber including a flexure region according to an embodiment of the present invention.
Figure 1C:
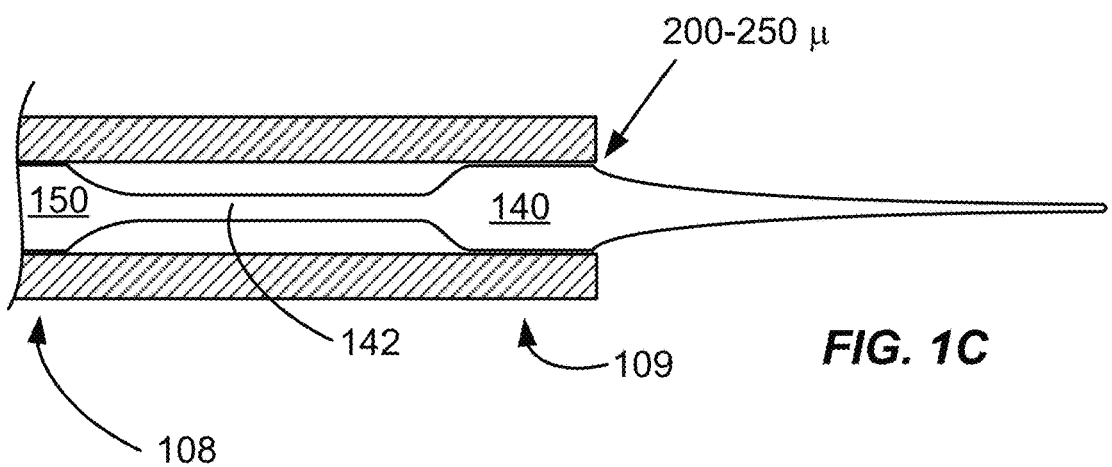
FIG. 1C is a simplified side view illustrating a shaped fiber including a support region according to an embodiment of the present invention.
Figure 1D:
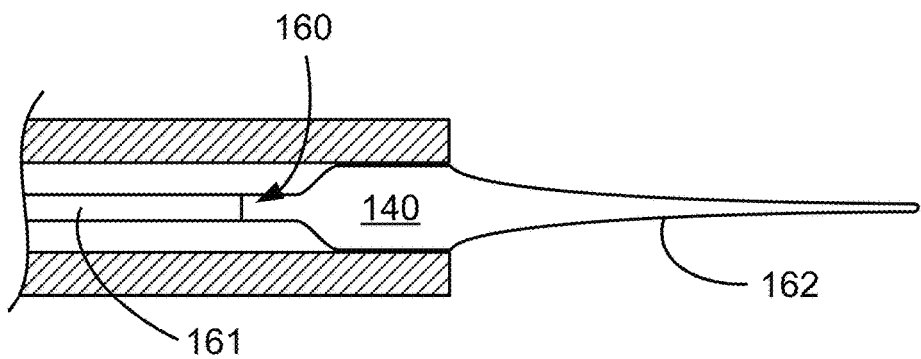
FIG. 1D is a simplified side view illustrating a multi-element shaped fiber according to an embodiment of the present invention.
Figure 1E:
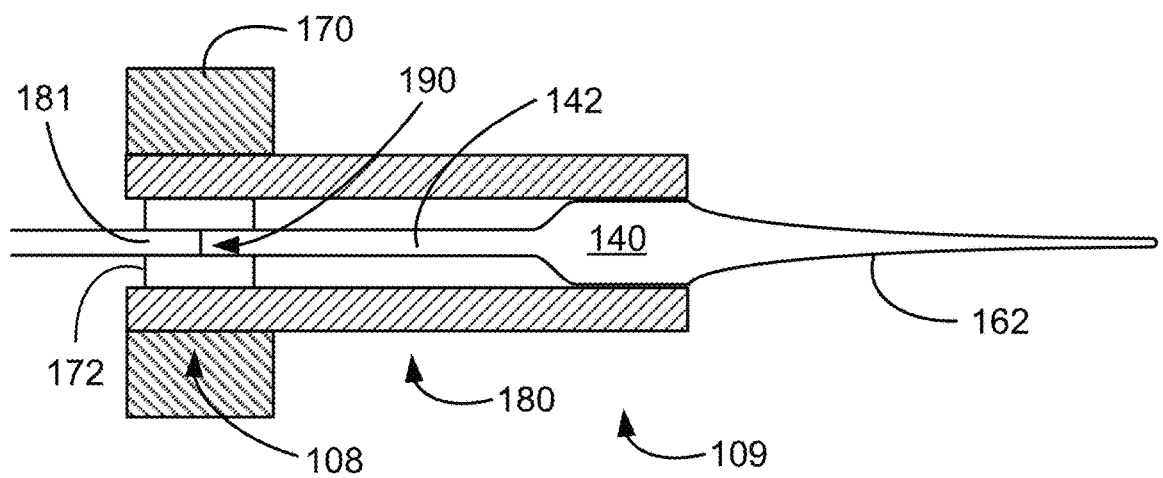
FIG. 1E is a simplified side view illustrating a multi-element shaped fiber according to another embodiment of the present invention.
Figure 1F:
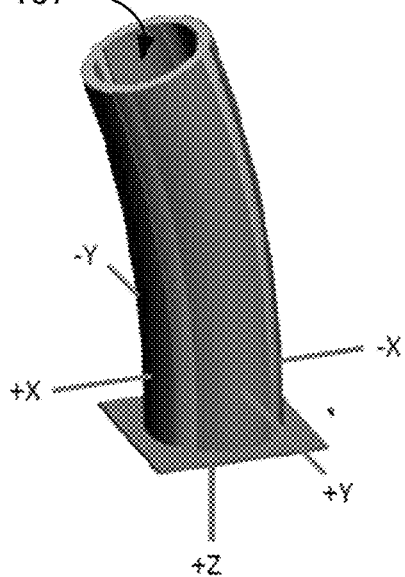
FIG. 1F is a simplified perspective view of a piezoelectric motion actuator according to an embodiment of the present invention.

FIG. 1F is a simplified perspective view of a piezoelectric motion actuator according to an embodiment of the present invention. The piezoelectric motion actuator illustrated in FIG. 1F includes four actuation inputs (+X, −X, +Y, and −Y) disposed in a cylindrical casing. The fiber optic cable passes through the orifice 107 and by actuation of the four actuation inputs, the fiber optic cable can be scanned in two dimensions. In FIG. 1F, contraction of the +X actuation input and expansion of the −X actuation input causes the piezoelectric motion actuator to tilt toward the +X axis. Although the motion illustrated in FIG. 1F is in two dimensions (i.e., along planes defined by the x-axis and y-axis), embodiments of the can also expand or contract all four actuation inputs in unison to contract/expand along the z-axis. Thus, embodiments of the present invention provide for both motion in the x-direction and the y-direction, as well as the use of cylindrical actuators that compress/expand in the z-direction.

Figure 1G:
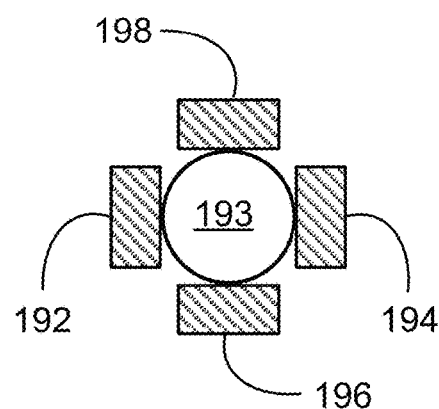
FIG. 1G is a simplified end view illustrating a multi-element motion actuator according to an embodiment of the present invention.

In addition to the cylindrical motion actuator illustrated in FIG. 1A, the scope of the present invention includes implementations in which other geometries are utilized for the motion actuator. As an example, in an embodiment, the motion actuator includes a plurality of opposing motion actuation elements (e.g., piezoelectric elements) that operate in conjunction with each other as a multi-element motion actuator. FIG. 1G is a simplified end view illustrating a multi-element motion actuator according to an embodiment of the present invention. The view illustrated in FIG. 1G is aligned with the longitudinal axis. As illustrated in FIG. 1G, a first motion actuation element 192 positioned on one side of the fiber optic cable 193 and a second motion actuation element 194 positioned on the opposite side of the fiber optic cable can contract/expand in concert to cause the fiber optic cable to move in the horizontal plane. A third motion actuation element 196 positioned on a third side of the fiber optic cable 193 and a fourth motion actuation element 198 positioned on the opposite side of the fiber optic cable can contract/expand in concert to cause the fiber optic cable to move in the vertical plane. By actuation of all four motion actuation elements, the fiber can be scanned in two dimensions as appropriate to use in a projection display. The embodiment illustrated in FIG. 1G can provide for a lighter system by reducing the piezoelectric mass. In addition to the rectangular geometry illustrated in FIG. 1G, other geometries, including hexagonal, triangular, and the like are included within the scope of the present invention.

In some embodiments, the materials of the motion actuator, e.g., the piezoelectric material, and the fiber optic cable, e.g., glass, are in direct mechanical contact. In other embodiments, substantial mechanical contact is provided by the insertion of an interface layer between the motion actuator and the fiber optic cable. In these embodiments, the fiber optic cable is slightly smaller in diameter than the motion actuator barrel, enabling a thin layer of adhesive to be utilized to join the fiber optic cable to the motion actuator. In these embodiments, substantial mechanical contact is provided by the insertion of the interface layer between the motion actuator and the fiber optic cable. The interface layer can be disposed between the coupling region 131 and the projection region 109 as well as at other portions of the motion actuator. As examples, the interface layer can include at least one of frit glass, epoxy, or the like. In one embodiments, frit glass, for example, in the form of a preform, is placed at the interface between the motion actuator and the fiber, for example, to the right of the end of the motion actuator. The frit glass, which can have different layers making up the preform, can then be reflowed into the interface between the coupling region and the projection region. After reflowing the frit glass may be present both in the interface and outside the motion actuator, forming a seal around the fiber where it exits the motion actuator. As an example, a ring of material could be placed around the fiber at the right side of the motion actuator. Upon heating, the material could flow into the interface region and form a stress relief element surrounding the fiber. When used as an interface material, epoxy is a damping material, which can provide benefits in some implementations.

The fiber optic cable includes a light delivery region 136 that extends away from the projection region 109 of the motion actuator 105 and a light emission region 138.

The fiber optic cable also includes a light emission tip 134. The fiber is tapered in some embodiments such that the light delivery region 136 is characterized by a first diameter and the light emission tip 134 is characterized by a second diameter that is less than the first diameter as the fiber tapers towards the tip. The tapering can be continuous (i.e., constantly decreasing diameter as a function of position) in some embodiments.

The tapering in the light delivery region 136 can be rapid, with the tapering decreasing in rate as it approaches the tip. Thus, the slope of the taper can be large in the light delivery region and smaller in the light emission region. As an example, the starting diameter of the fiber can be in the range of 200 μm-250 μm, the rapid tapering can reduce the diameter to a value in the range of 100 μm-125 μm within about 50 μm to 100 μm, for example, 85 μm of fiber length, and then the tapering profile can be reduced to a substantially linear taper to a diameter at the light emission tip 134 of 20 μm-40 μm, for example, 30 μm, 35 μm, or the like. The rapid tapering in the light delivery region can provide strain and/or stress relief and, as a result, the tapering profile in this region can be selected to reduce or minimize strain on the fiber during actuation and reduce stress localization. Elliptical profiles, other arcs, including non-linear profiles determined using finite element analysis, and the like can be utilized for the tapering profile.

FIG. 1B is a simplified side view illustrating a shaped fiber including a flexure region according to an embodiment of the present invention. Referring to FIG. 1B, in order to reduce potential binding between the longitudinal side members and the fiber optic cable as the cable oscillates in response to actuation of the motion actuator, a flexure region is provided between the support region and the projection region. The spatial separation between the fiber optic cable and the longitudinal side members allows the fiber optic cable to move in the lateral direction, reducing or eliminating binding as the longitudinal side members expand and contract. The lateral direction covers all motion in the plane orthogonal to the longitudinal direction. As an example, if the longitudinal direction is aligned with the z-axis, lateral motion will include motion in the x-y plane. Thus, lateral motion includes spiral motion in which the fiber optic cable moves in the x-y plane as the center of the fiber traces out a spiral pattern in the x-y plane.

Referring to FIG. 1B, to reduce the stiffness of the motion actuator and improve flexibility, the coupling region of the fiber optic cable includes a support portion 140 in mechanical contact with the longitudinal side members and a flexure region 142 disposed between the support region and the projection region, wherein the flexure region is separated from the longitudinal side members by a flexure distance, d. The flexure region formed by necking down the fiber diameter enables additional flexibility in comparison with designs that increase the mechanical contact between the fiber optic cable and the interior surfaces of the longitudinal support members.

FIG. 1C is a simplified side view illustrating a shaped fiber including a support region according to an embodiment of the present invention. In FIG. 1C, the fiber optic cable also includes a coupling region 150, not only at the projection region of the motion actuator, but also at the support region of the motion actuator. In this embodiment, the lateral dimension of the fiber optic cable is decreased in the flexure region 142 to reduce binding, but increased adjacent the support region and the projection region in order to provide the desired mechanical contact between the motion actuator and the fiber optic cable. The coupling region 150 can be referred to as a second support portion in mechanical contact with the longitudinal side members. In an embodiment, the fiber diameter can be increased back to the original diameter to match the inner diameter of the longitudinal side members of the motion actuator.

FIG. 1D is a simplified side view illustrating a multi-element shaped fiber according to an embodiment of the present invention. Referring to FIG. 1D, in some embodiments, multiple types of optical waveguides are utilized to assemble the fiber scanning system. As discussed below in relation to FIG. 1E, the second fiber optic cable 162 illustrated in FIG. 1D can be replaced with an optical waveguide element fabricated by mechanisms other than drawn fiber processes.

For purposes of clarity, the discussion related to FIG. 1D will discuss the use of a fiber optic cable as the second optical waveguide, but embodiments of the present invention are not limited to this implementation. In addition, although embodiments of the present invention are discussed herein in relation to the use of a fiber optic cable, other optical waveguide structures can be utilized in place of fiber optic cables. In addition to optical waveguide structures, integrated optical elements and the like can be spliced to fiber optic cables or other optical structures and motion actuators using the techniques described herein. One of ordinary skill in the art would recognize many variations, modifications, and alternatives.

As illustrated in FIG. 1D, a first fiber optic cable 161 can be utilized as an input fiber 161 and a second fiber optic cable 162 can be utilized as a delivery fiber that is mechanically coupled to the motion actuator and includes a tapered light delivery region. The input fiber can be a smaller diameter fiber than the delivery fiber. The two fiber optic cables are spliced at a splice joint 160. In the illustrated embodiment, the splice joint 160 is positioned in the flexure region so that a lateral separation (e.g., a flexure distance) is provided between the splice joint and the longitudinal side members.

Referring to FIG. 1D, the fiber optic element, which can be part of a fiber scanning system, includes a motion actuator, a first fiber optic cable, and a second fiber optic cable. The motion actuator includes longitudinal side members, an internal orifice disposed between the longitudinal side members, a first support region disposed at one end of the motion actuator, a central region, and a second support region disposed at an opposing end of the motion actuator.

The first fiber optic cable 161 passes through the internal orifice of the motion actuator and has a first coupling region 140 disposed between the longitudinal side members and a first fiber joint (the left side of splice joint 160) disposed in the central region. A second fiber optic cable passing through the internal orifice and has a second fiber joint (the right side of splice joint 160) disposed in the central region and spliced to the first fiber joint. In some embodiments, the second fiber optic cable also has a second coupling region disposed between the longitudinal side members and in mechanical contact with the second support region.

Referring to the embodiment illustrated in FIG. 1D, the second fiber optic cable 162 can include a light delivery region extending away from the second support region of the motion actuator and a light emission tip. The light delivery region can be tapered towards the light emission tip. In some embodiments, the diameter of the second fiber optic cable in first coupling region 140 is substantially equal to the inner diameter of the internal orifice of the motion actuator. In other embodiments, a mechanical fixture can be used to retain the first coupling region of the first fiber optic cable with respect to the first support region. As an example, an o-ring can be used to support the thin fiber between the longitudinal side members.

Although not illustrated in FIG. 1D, the first coupling region of the first fiber optic cable can be in mechanical contact with the first support region of the motion actuator as illustrated by coupling region 150 in FIG. 1C. Thus, combinations of the elements illustrated in the various figures provided herein can be combined as appropriate to the particular application. One of ordinary skill in the art would recognize many variations, modifications, and alternatives.

Methods of fabricating the second fiber optic cable can include masking and etching processes. As an example, a fiber optic cable could be masked with an etch resistant mask on the portions that will become the tip of the fiber. After the tip is masked, the central region can be immersed in an etchant solution, for example, the three-layer etch system illustrated in FIG. 6C. As the tip of the fiber passes through the etchant during the immersion process, the mask would protect the tip from being etched. After the central region is etched to form a reduced diameter flexure region and the fiber is removed from the etch system, the etch resistant mask on the tip can be removed and a second etching process can be used to form the desired shape (e.g., a tapered shape) for the tip of the fiber. Additionally, during this second etching process, an etch resistant mask can be applied to the central region to preserve the shape formed after the first etch process.

In some embodiments, the order can be modified, for example, reversed, to form the tip first and then the central region as the flexure region. In these processes, the rate at which the fiber is inserted and/or withdrawn from the etchant can be utilized to control the shape of the fiber. One of ordinary skill in the art would recognize many variations, modifications, and alternatives.

FIG. 1E is a simplified side view illustrating a multi-element shaped fiber according to another embodiment of the present invention. In this implementation, the motion actuator is attached to a mechanical mount using supports 170, which can also be referred to as an attachment collar. The motion actuator vibrates relative to the base (not shown) to which supports 170 are attached. In this alternative embodiment, the splice joint 160 that joins the two fiber optic cables is positioned between supports 170 to which the motion actuator is coupled.

As shown in FIG. 1E, a retaining element 172 is disposed in the first support region 108. The first fiber optic cable passes between the retaining element 172 and the internal orifice of the motion actuator. The first fiber optic cable is joined to the second fiber optic cable by the splice joint 160, which is defined by a first fiber joint of the first fiber optic cable (to the left of the splice joint) and a second fiber joint of the second fiber optic cable (to the right of the splice joint). The splice joint is positioned longitudinally such that it is disposed in the retaining element. The position of the splice joint in the retaining element and between the supports 170 reduces the mechanical stress on the splice joint, which is an area of reduced flex, since the motion actuator is moving with respect to the supports.

In some embodiments, the retaining element 172 is formed by depositing a flexible adhesive, for example, a silicone ball, on the splice joint between the first optical fiber and the second optical fiber and moving the sliced fibers with the deposited flexible adhesive such that the adhesive is positioned between the supports and allowing the adhesive to cure in this position. Although silicone is used an example, the present invention is not limited to this implementation and other retaining elements that provide suitable mechanical rigidity and desired lifetime can be utilized.

Moreover, although the splice joint is illustrated between the supports in FIG. 1E, this is not required by the present invention and the splice joint can be moved to other positions to the left of the supports, which can also be characterized as low-flex regions. Thus, the precision with which the splice joint is placed can be relaxed in some embodiments, improving manufacturability.

Referring once again to FIG. 1E, a fiber optic element of a fiber scanning system is provided. The fiber optic element includes a motion actuator, a first optical waveguide, and a second optical waveguide. The first optical waveguide can be a first fiber optic cable and the second optical waveguide can be a second fiber optic cable. The motion actuator has longitudinal side members and an internal orifice disposed between the longitudinal side members. The motion actuator has a first support region 108 disposed at one end of the motion actuator and a second support region 109 disposed at an opposing end of the motion actuator, thereby defining a central region 180.

The motion actuator can include a piezoelectric actuator, which can be positioned in a plane including the first support region 108, the first mating surface splice, and the second mating surface. In other embodiments, the longitudinal side members include piezoelectric elements that contract and expand as discussed above. In these embodiments, the piezoelectric actuator positioned in the plane of the splice joint 160 can be replaced with mechanical supports that support the motion actuator.

A retaining element 172 is disposed in the first support region 108 between the longitudinal side members. A first optical waveguide 181, which can be a first fiber optic cable, passes through the retaining element and the internal orifice. The first optical waveguide has a first mating surface (the left side of splice joint 160) disposed in the retaining element 172. The second optical waveguide passes through the internal orifice and has a second mating surface (the right side of splice joint 160) disposed in the retaining element 172 and joined to the first mating surface. The second optical waveguide, which can be a second fiber optic cable, has a second coupling region 140 disposed between the longitudinal side members and in mechanical contact with the second support region 109. The second optical waveguide further includes a light delivery region extending away from the second support region of the motion actuator and a light emission tip. The light delivery region can be tapered as illustrated in FIG. 1E.

As illustrated in FIG. 1E, the retaining element 172 is operable to retain the splice joint 160 with respect to the first support region 108 and support the portions of the first and second optical waveguides. Accordingly, as illustrated in FIG. 1E, mechanical contact between the second coupling region 140 and the longitudinal side members as well as between the first and second optical waveguides, the retaining element, and the first support region 108 of the motion actuator provides for securing of the optical waveguides. At the same time, the flexure region enables the second optical waveguide to move laterally as the light emission tip oscillates in the plane of the figure. As shown in FIG. 1E, the second optical waveguide can include a flexure region 142 disposed between the second mating surface and the second coupling region 140 to provide a lateral separation (i.e., a flexure distance) between the longitudinal side members and the flexure region.

Referring to FIG. 1E, the first optical waveguide can be fabricated as a fiber optic cable. In some embodiments, the second optical waveguide is fabricated as a second fiber optic cable, but this is not required by embodiments of the present invention. In alternative embodiments, the second optical waveguide can be fabricated using processes other than fiber drawing processes, for example, using a micro-electro-mechanical system (MEMS) or a micro-opto-electro-mechanical system (MOEMS) microfabrication process. Thus, molded parts and optical waveguides fabricated using additive manufacturing are included within the scope of the present invention, for example, cantilevered structures, channel waveguides, and the like.

As discussed above in relation to FIG. 1D, the second fiber optic cable can be replaced with another type of optical waveguide structure. Accordingly, embodiments of the present invention can utilize combinations of fiber optic cables fabricated using fiber drawing processes and optical waveguide elements fabricated using other microfabrication techniques. It should be noted that the embodiments described herein as utilizing fiber optic cables can be modified to utilize other forms of optical waveguide structures in place of or in combination with one or more fiber optic cables. Thus, the embodiments that are illustrated as using a fiber optic cable as an element are not limited to this particular waveguide design and other optical waveguide designs can be utilized in these embodiments. One of ordinary skill in the art would recognize many variations, modifications, and alternatives.

Figure 2A:
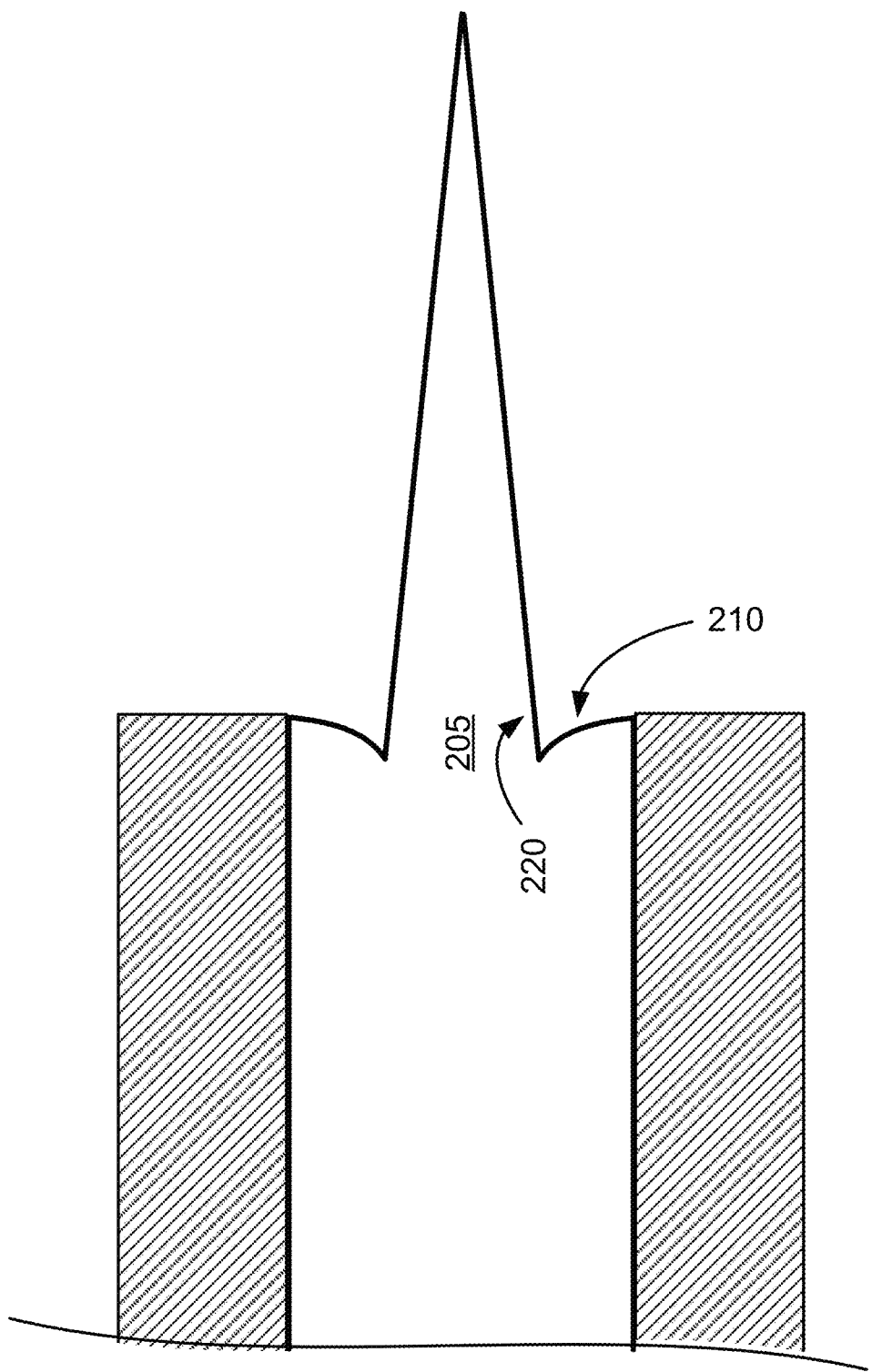
FIG. 2A is a simplified side view illustrating a shaped fiber including a reentrant profile according to an embodiment of the present invention.

FIG. 2A is a simplified side view illustrating a shaped fiber including a reentrant profile according to an embodiment of the present invention. In the embodiment illustrated in FIG. 2A, the light delivery region of the fiber optic cable is etched or otherwise processed to modify the diameter between the actuators making up the projection region of the motion actuator. As illustrated in FIG. 2A, the light delivery region includes a reentrant profile adjacent (e.g., surrounding) the delivery waveguide. As the fiber oscillates in the plane of the figure in response to the motion actuation, the portions of the delivery waveguide 205 adjacent the reentrant profile 210 will experience reduced strain since the edges 220 of the delivery waveguide 205 substantially match the contour of the reentrant profile 210 as the edges make contact with the reentrant profile.

The smooth curved surface characterizing the reentrant profile 210 provides a reduced stress contact surface that is beneficial for lifetime. The reentrant profile illustrated in FIG. 2A can be integrated into other designs discussed herein. Methods of fabricating the reentrant profile are discussed in additional detail with respect to FIGS. 3A-3C. One of ordinary skill in the art would recognize many variations, modifications, and alternatives.

Figure 2B:
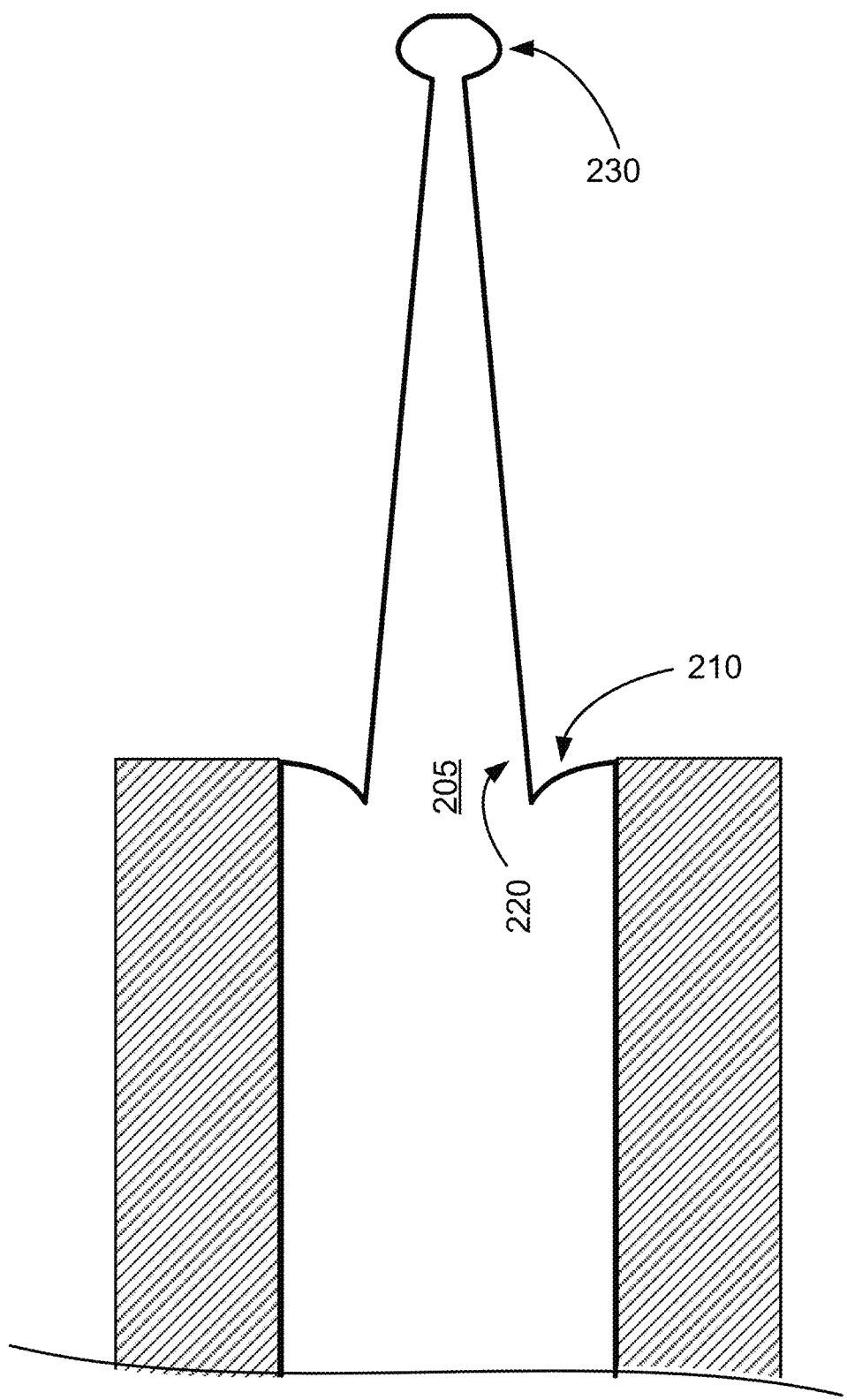
FIG. 2B is a simplified side view illustrating a shaped fiber including an optical element at the tip of the fiber according to an embodiment of the present invention.

Although a tapered fiber with a tapered end is illustrated in FIG. 2A, this is not required by the present invention and the end of the fiber can feature other optical structures. As an example, a lensed element may be utilized. FIG. 2B is a simplified side view illustrating a shaped fiber including an optical element at the tip of the fiber according to an embodiment of the present invention. An optical element 230 is integrated into the tip of the fiber. The optical element can provide one of several optical functions including focusing as a lens, collimating the fiber output, and the like. In some embodiments, in addition to optical properties, the optical element also serves a mechanical function with the mass of the optical element being utilized to accentuate the oscillatory motion of the cantilevered fiber.

Figure 3A:
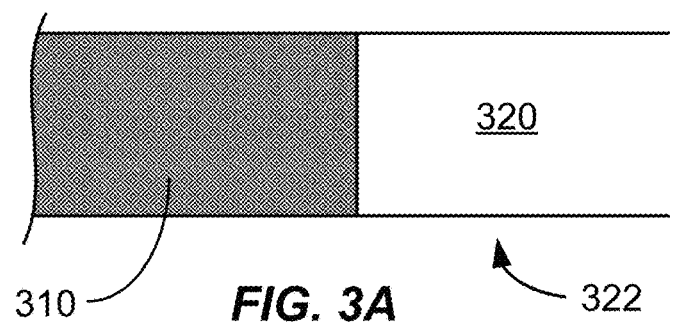
FIG. 3A is a simplified side view illustrating a portion of an optical waveguide and an etch resistant jacket according to an embodiment of the present invention.

FIG. 3A is a simplified side view illustrating a portion of an optical waveguide and an etch resistant jacket according to an embodiment of the present invention. As illustrated in FIG. 3A, an optical waveguide 320, which can be an optical fiber, is partially coated with an etch resistant jacket 310. The etch resistant jacket can be formed using materials that are resistant to etching, or the like.

Figure 3B:
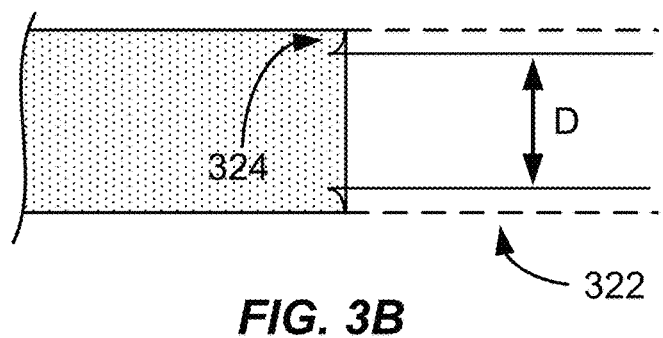
FIG. 3B is a simplified side view illustrating wicking of an etchant below the etch resistant jacket illustrated in FIG. 3A according to an embodiment of the present invention.

FIG. 3B is a simplified side view illustrating wicking of an etchant below the etch resistant jacket illustrated in FIG. 3A according to an embodiment of the present invention. As the optical waveguide 320 and the etch resistant jacket 310 is exposed to an etchant solution, the exposed portion 322 of the waveguide will be etched as illustrated by the decrease in diameter D of the waveguide. Additionally, an inclusion can be formed at the jacket/waveguide interface and capillary action will draw etchant between the waveguide (e.g., fiber) and the jacket and, as a result, some of the etchant will wick under the jacket, etching the reentrant profile 324 illustrated in FIG. 3B.

Figure 3C:
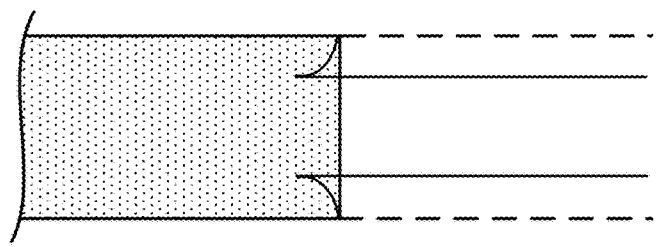
FIG. 3C is a simplified side view illustrating further wicking of the etchant below the etch resistant jacket.

FIG. 3C is a simplified side view illustrating further wicking of the etchant below the etch resistant jacket. As the etch process continues, the diameter of the waveguide in the exposed portion continues to decrease and the reentrant profile is formed at a greater depth under the jacket. The etch process is continued until the desired reentrant profile is formed. Using some etch chemistries, such as BOE, a reentrant profile associated with a diameter reduction on the order of 50 µm can be accomplished in less than an hour, for example, 20 minutes.

Figure 3D:
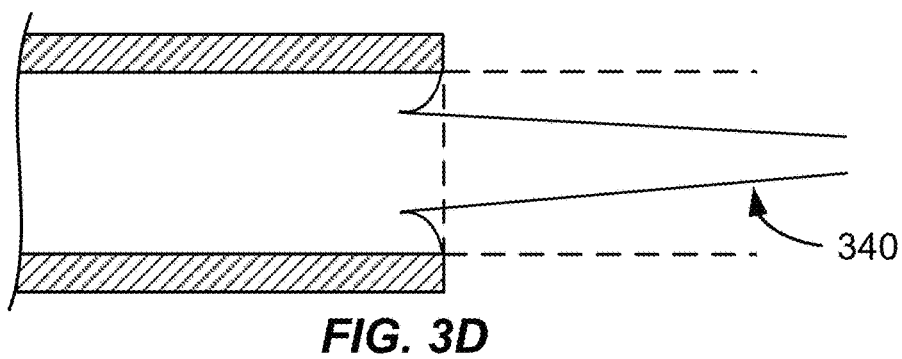
FIG. 3D is a simplified side view illustrating tapering of the optical waveguide according to an embodiment of the present invention.

FIG. 3D is a simplified side view illustrating tapering of the optical waveguide according to an embodiment of the present invention. After formation of the reentrant profile, the tapered profile 340 illustrated in FIG. 3D can be fabricated using additional material removal processes. As an example, the original etch resistant jacket could be removed and/or the fiber could be coated again with an additional etch resistant jacket and a secondary etch process could be used to form the desired tapered profile.

Figure 3E:
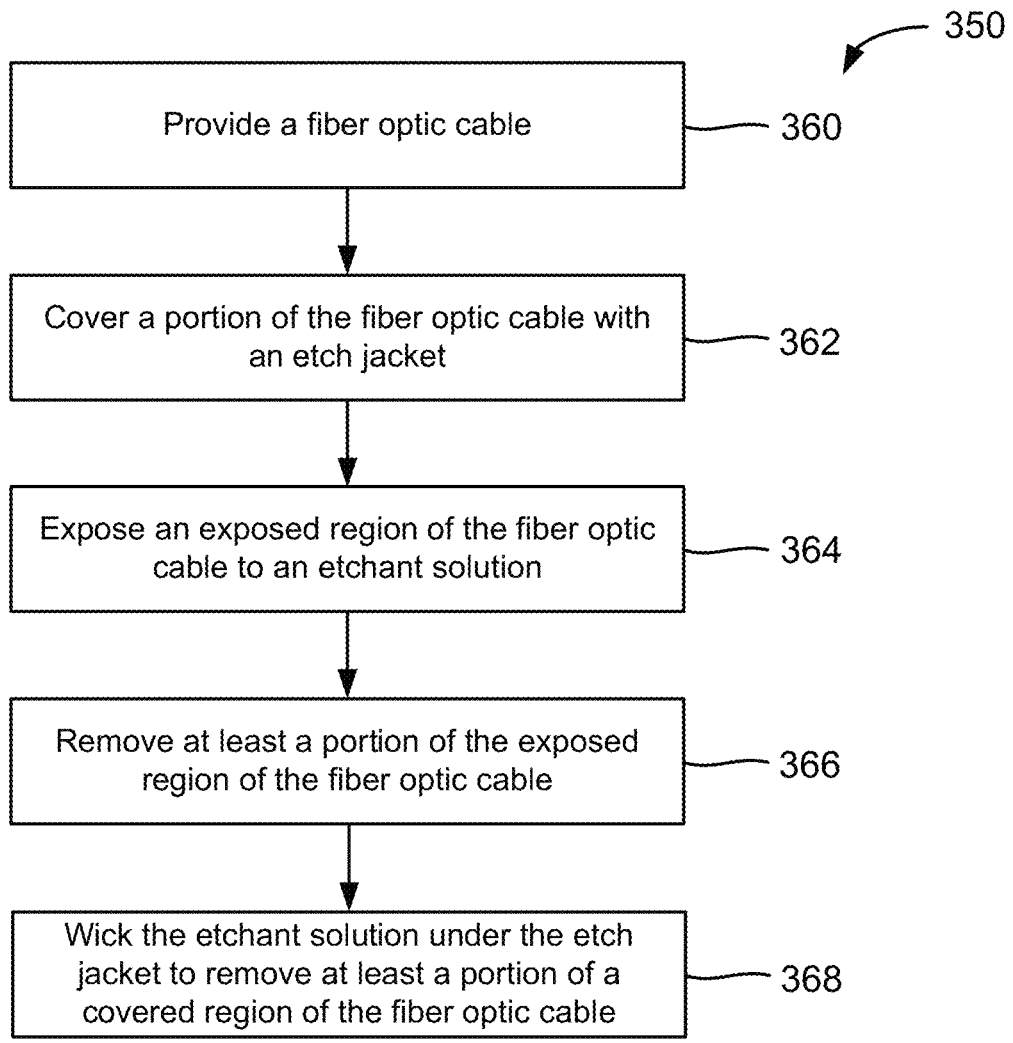
FIG. 3E is a simplified flowchart illustrating a method of fabricating a shaped fiber according to an embodiment of the present invention.

FIG. 3E is a simplified flowchart illustrating a method of fabricating a shaped fiber according to an embodiment of the present invention. The method 350 includes providing a fiber optic cable (360) and covering a portion of the fiber optic cable with an etch jacket to define an exposed region of the fiber optic cable and a covered region of the fiber optic cable (362). The method also includes exposing the exposed region of the fiber optic cable and the etch jacket to an etchant solution (364) and removing at least a portion of the exposed region of the fiber optic cable in response to exposure to the etchant solution (366). The method further includes wicking the etchant solution under the etch jacket to remove at least a portion of the covered region of the fiber optic cable (368). In an embodiment, wicking the etchant solution under the etch jacket comprises capillary flow of the etchant solution. In one implementation, the portion of the covered region of the fiber optic cable removed under the etch jacket is characterized by a reentrant profile.

Figure 4:
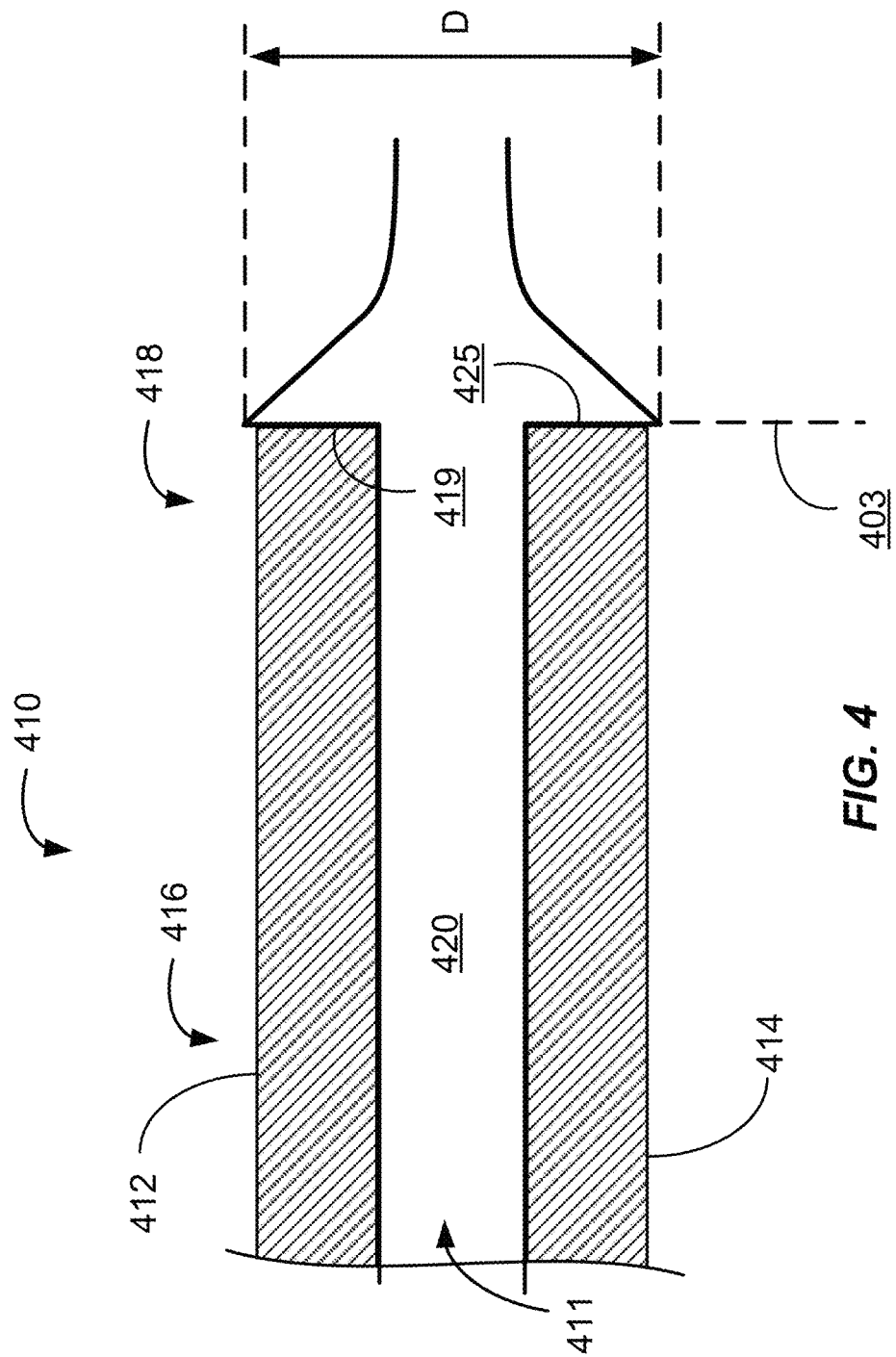
FIG. 4 is a simplified side view illustrating a shaped fiber including a support flange according to an embodiment of the present invention.

FIG. 4 is a simplified side view illustrating a shaped fiber including a support flange according to an embodiment of the present invention. As illustrated in FIG. 4, the motion actuator can be implemented as a hollow piezoelectric tube through which the fiber optic cable passes. In this embodiment, the initial diameter of the fiber optic cable (e.g., the outer cladding diameter) is larger than the interior diameter of the motion actuator. As an example, starting with a 500 µm diameter fiber, the portion to the left of plane 403 is etched to a diameter substantially equal to the interior diameter of the motion actuator. Thus, a flange 425 is created so that the flange covers the end of the motion actuator. The presence of the flange provides a strong mechanical coupling between the motion actuator and the fiber optic cable since the base region of cantilever extends to the front surface of the actuator.

Referring once again to FIG. 4, a fiber actuator mechanism is provided that includes a motion actuator and a fiber optic cable passing through the motion actuator. The motion actuator 410 has longitudinal side members 412 and 414, an internal orifice 411 disposed between the longitudinal side members, a support region 416 disposed at one end of the motion actuator, and a projection region 418 opposing the support region and having a projection face 419.

The fiber optic cable 420 passes through the internal orifice 411 and has a coupling region disposed between the longitudinal side members and in mechanical contact with the projection region. The fiber optic cable also has a light delivery region extending away from the projection region of the motion actuator. The light delivery region includes a flange 425 extending along the projection face of the projection region. In the illustrated embodiment, the projection face is substantially planar and the flange is substantially planar, providing a tight fit between the two surfaces. The fiber optic cable further includes a light emission tip (not shown in FIG. 4, but illustrated in FIG. 1A).

In an embodiment, the light delivery region of the fiber optic cable includes a tapered region that extends longitudinally away from the projection face of the projection region as illustrated in FIG. 4. The tapered region can be linearly tapered or non-linearly tapered as appropriate to the particular application. In the implementation illustrated in FIG. 4, the slope associated with the tapered region decreases with distance from the flange, initially starting at a steep tapering angle and then become less steeply tapered as the distance to the light emission tip decreases. In other embodiments, the slope is varied in other manners. One of ordinary skill in the art would recognize many variations, modifications, and alternatives.

In embodiments in which the motion actuator utilizes ceramic piezoelectric materials, the motion actuator is relatively stiff as it vibrates, whereas the fiber is more flexible. Accordingly, at the ends of the vibration range, the fiber exerts pressure on the piezoelectric as the fiber reaches the end of the vibration range. As a result, the tip of the piezoelectric actuator experiences high forces. In order to address these forces, some embodiments utilize fiber structures that partially surround the piezoelectric actuator.

Figure 5A:
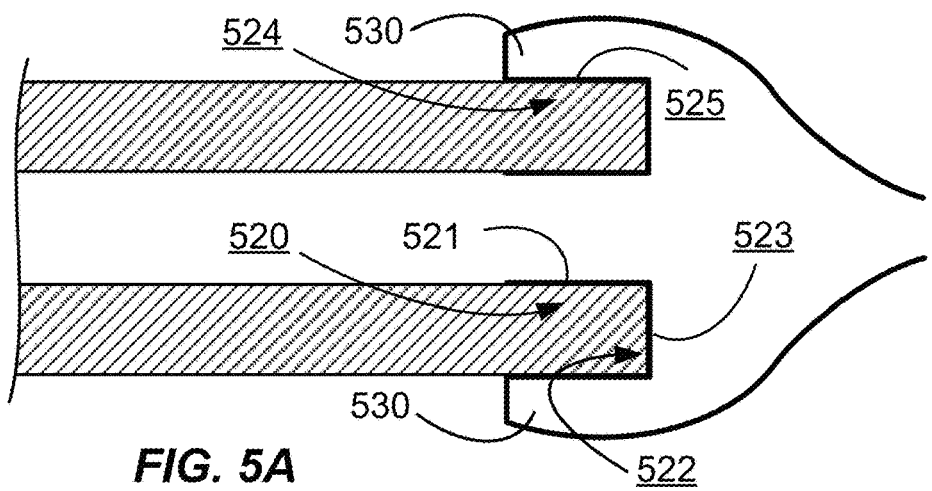
FIG. 5A is a simplified side view illustrating a shaped fiber including a motion actuator coupling region according to an embodiment of the present invention.

FIG. 5A is a simplified side view illustrating a shaped fiber including a motion actuator coupling region according to an embodiment of the present invention. In the implementation illustrated in FIG. 5A, a pocket for the ends of the longitudinal side members of the motion actuator (e.g., a piezoelectric actuator) is provided such that the fiber optic cable includes elements that surround portions of the motion actuator. This embodiment prevents the motion actuator elements (e.g., the ends of the longitudinal side members) from cracking as the fiber optic cable oscillates in the plane during operation. The structural integrity is also increased as the surface area over which the surfaces of the longitudinal side members and the surfaces of the fiber optic cable overlap, increases.

The direct mechanical coupling illustrated in FIG. 5A ensconces the ends of the longitudinal side members in the pockets formed in the fiber optic cable. The pressure applied by the opposing inner surfaces and outer surfaces of the fiber optic cable prevents cracking of the motion actuator arms.

Referring to FIG. 5A, a fiber actuator mechanism is provided that includes a motion actuator and a fiber optic cable. The motion actuator has longitudinal side members, an internal orifice disposed between the longitudinal side members, a support region disposed at one end of the motion actuator, and a projection region opposing the support region. The projection region has a projection internal surface 520 of the internal orifice, a projection face 522 and a projection exterior surface 524.

A fiber optic cable passes through the internal orifice and has a coupling region disposed between the longitudinal side members and in mechanical contact with the projection region, a light delivery region surrounding and extending away from the projection region of the motion actuator, and light emission tip. The light delivery region includes a first region 521 parallel to the projection internal surface 520, a second region 523 parallel to the projection face 522, and a third region 525 parallel to the projection exterior surface 524. A light emission tip (not shown) is also an element of the fiber optic cable.

In the embodiment illustrated in FIG. 5A, the first region 521 of the fiber is in mechanical contact with the projection internal surface 520 of the motion actuator and the second region 523 is in mechanical contact with the projection face 522. In other embodiments, the third region 525 is in mechanical contact with the projection exterior surface 524. The light delivery region can further include a fourth region 530 surrounding the projection region to provide for additional mechanical support of the fiber and the motion actuator. In FIG. 5A, the contact surfaces are substantially planar in cross-section, for example, cylindrical, but as described below, this is not required by the present invention.

Figure 5B:
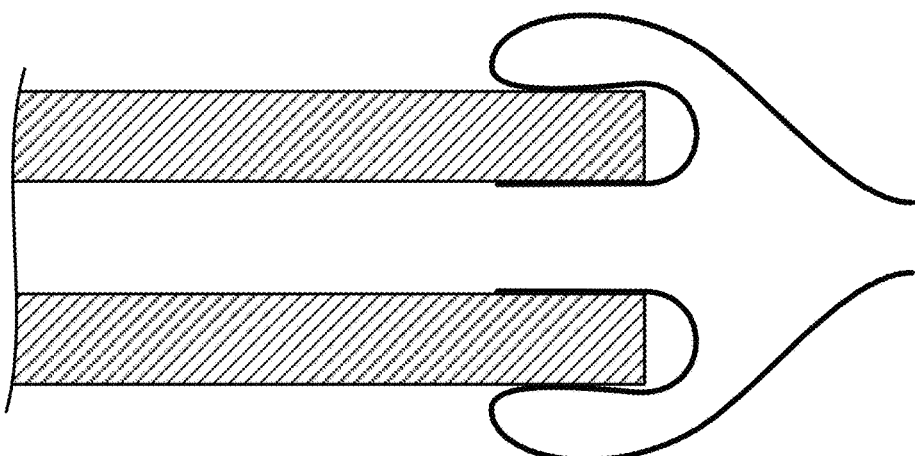
FIG. 5B is a simplified side view illustrating a shaped fiber including a motion actuator coupling region according to another embodiment of the present invention.

FIG. 5B is a simplified side view illustrating a shaped fiber including a motion actuator coupling region according to another embodiment of the present invention. In the embodiment illustrated in FIG. 5B, the fabrication process has not formed squared off surfaces, but surfaces that include curved features. In addition, the ends of the motion actuator can be substantially flat as illustrated in FIG. 5B, but in other embodiments, the ends can be rounded or characterized by other shapes as appropriate to the particular application. In the embodiment illustrated in FIG. 5B, if the width of the longitudinal side members is wider than the width of the pockets, the portions of the fiber surrounding the pockets will flex as the longitudinal side members are inserted into the pockets, providing tight contact between the interior surfaces of the pockets and the exterior surfaces of the longitudinal side members.

Depending on the application, the surface contact between the pockets and the longitudinal side members is provided at sufficient levels to ensure sufficient mechanical coupling. For instance, the size (e.g., length and width) of the contact surfaces is selected in some embodiments to provide mechanical support without the use of adhesives. In other embodiments, additional adhesion materials, including epoxy can be used to enhance the mechanical coupling, with the curved features providing room for the epoxy to move during assembly. For example, a potting material can be used to counteract the expansion of ceramic materials that can be utilized in the motion actuator and provide high hoop stress.

Figure 5C:
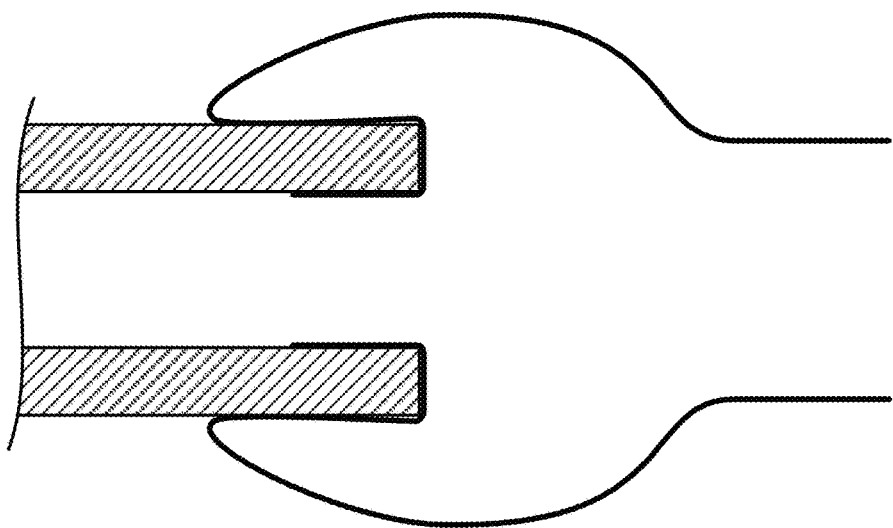
FIG. 5C is a simplified side view illustrating a shaped fiber including a motion actuator coupling region according to yet another embodiment of the present invention.

FIG. 5C is a simplified side view illustrating a shaped fiber including a motion actuator coupling region according to yet another embodiment of the present invention. In the embodiment illustrated in FIG. 5C, pockets with interior surfaces that are substantially planar in cross-section are utilized in conjunction with outer surfaces that are rounded.

In order to fabricate the structures illustrated in FIGS. 5A-5C, a laser ablation and/or sculpting process can be utilized to form the pockets into which the motion actuator elements are inserted. For instance the fiber can be etched to form the portion that will pass through the motion actuator, leaving a large diameter section including fourth region 530. The exposed surface can then be laser ablated to form the pockets. Another suitable fabrication technique is to mask and etch the desired structures, for example, in a multi-stage mask and etch process. Combinations of etching and laser ablation can also be used to form the recesses or pockets.

Figure 6A:
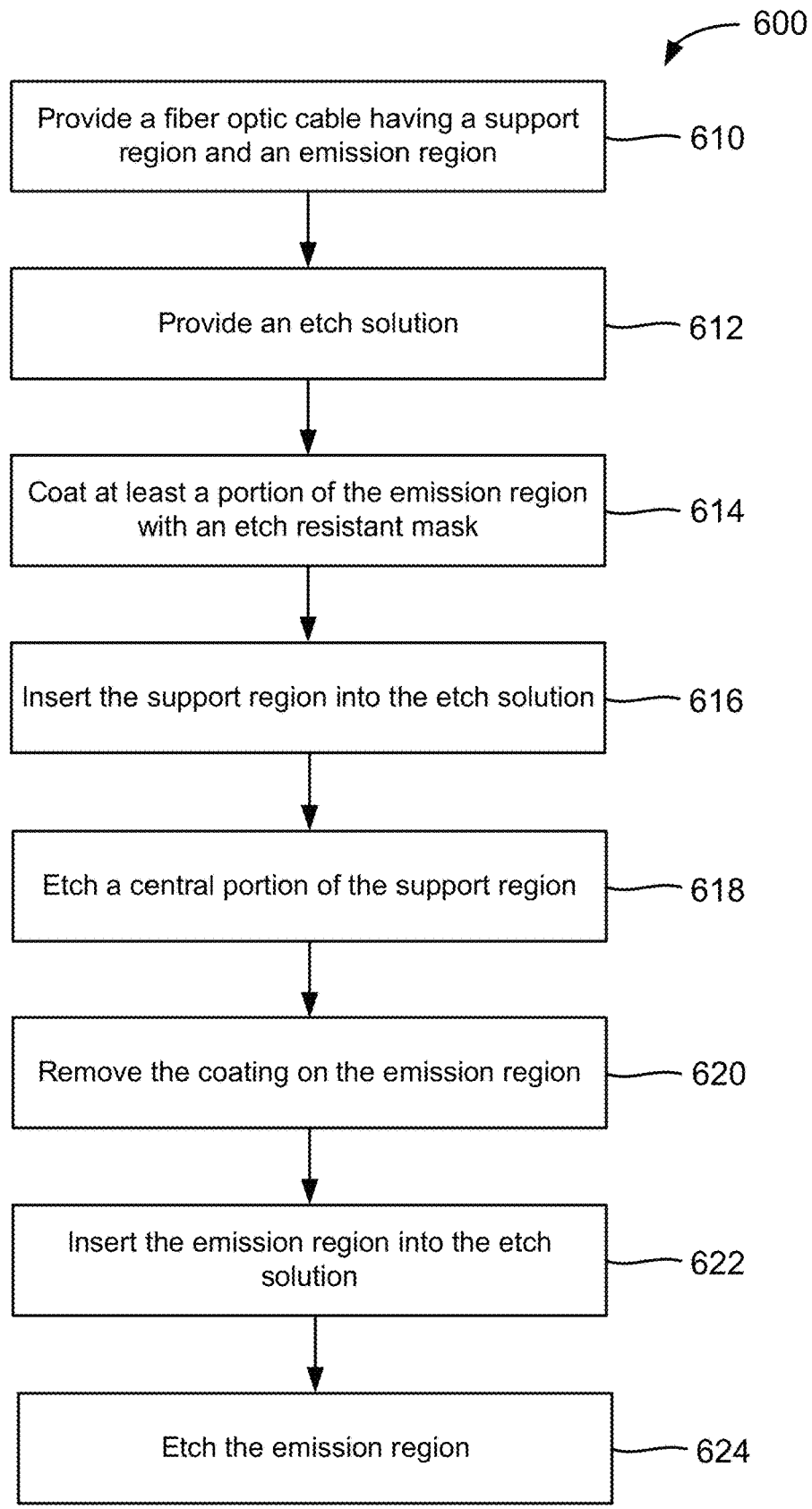
FIG. 6A is a simplified flowchart illustrating a method of fabricating a shaped fiber according to an embodiment of the present invention.
Figure 6B:
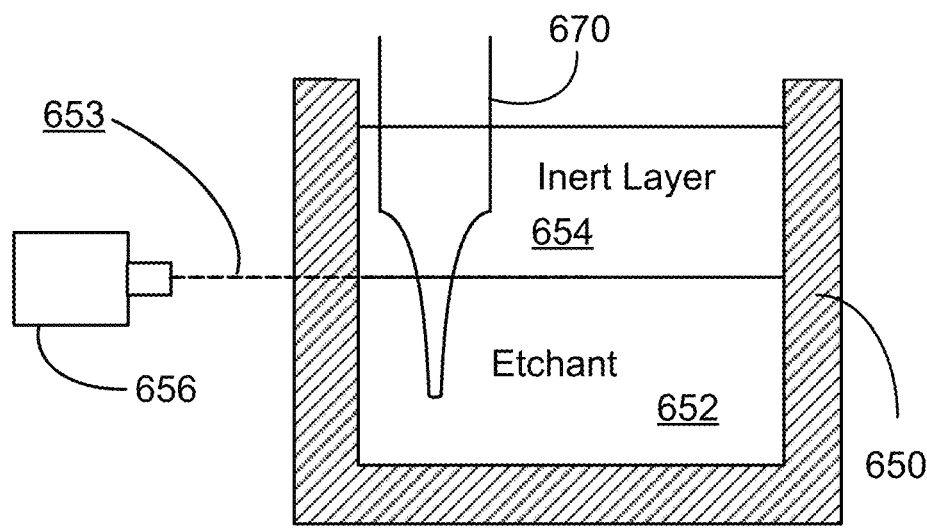
FIG. 6B illustrates an etch system according to an embodiment of the present invention.

FIG. 6B illustrates an etch system according to an embodiment of the present invention. In the embodiment illustrated in FIG. 6B, a sapphire or other etch-resistant container 650 is partially filled with an etchant solution 652 (e.g., an HF-based acid mixture) and an inert solution 654 (e.g., isooctane). The etchant solution 652 can include various components suitable for etching of the optical elements described herein, including buffered oxide etch (BOE) solution, including a surfactant such as ammonium fluoride, and the like. The inert solution 654 is less dense than the etchant solution in this implementation and prevents evaporation of the etchant and protects the portions of the fiber immersed in the inert solution from being etched, for example, by etchant evaporating and the resulting vapor etching the fiber. The inert layer can be referred to as a float layer in some implementations.

The portion of the fiber 670 to be etched is inserted into the etchant solution, for example, passing through the inert solution to enter the etchant solution. As the fiber is withdrawn from the etchant solution at a predetermined rate, the desired profile is etched into the etched portion of the fiber. In FIG. 6B, the fiber is illustrated as being inserted in a vertical direction that is perpendicular to the surface of the etchant solution. In some embodiments, the angle at which the fiber is inserted and/or withdrawn is controlled, for example, varied as a function of time, to control the etching profile achieved.

FIG. 6B illustrates camera 656, which can be used to image the fiber 670 as portions of the fiber are immersed in etchant solution 652. In the embodiment illustrated in FIG. 6B, the camera 656 is positioned level with the interface 653 between the inert solution 654 and the etchant solution 656. In other embodiments, the camera can be placed above the interface, below the interface, or the like. In such off-set views, the camera can observe the fiber without an interfering image of a meniscus line of an etchant or refractive error that may be captured by viewing at an interface of different materials (such as an inert or etchant layer). In other words, at off-set angles the camera may view the fiber through a fewer number of intermediate mediums and calculate an etch rate based on captured images compensating for fewer indices of refraction the captured light propagated to arrive at the camera. Additionally, an off-set enables the collection of additional image information. While the level viewing depicted in FIG. 6B permits etch rate viewing as a function of diameter changes, an off-set view may capture certain circumference etch characteristics as well such as how uniform the etch process is occurring along a fiber exterior, beyond simply the diameter width according to a particular view. In some embodiments, explained herein in additional detail in relation to agitation of the etch bath, non-uniform etching as determined from an off-set view may trigger an agitator to change a position of the fiber if non-uniform etching is observed. Additionally, although a single camera is illustrated in FIG. 6B, multiple cameras placed in various orientations with respect to the interface 653 can be utilized by embodiments of the present invention. Using camera 656, a user is enabled to view interface 653 and fiber 670 during insertion and withdrawal from the etch system. As an example, using one or more cameras, the diameter of the fiber at the interface can be determined and utilized in controlling the etch process. Accordingly, embodiments of the present invention utilize one or more cameras, computer vision systems, and the like to achieve fiber elements with various sections having predetermined lengths and diameters as described herein.

The fiber optic cable can be masked with an etch resistant mask to form masked regions that will not be etched despite being inserted into the etchant solution. The mask prevents etching of the masked region, for example, to fabricate the flexure region 142 illustrated in FIG. 1C. Subsequently, the mask can be removed and the fiber optic cable reinserted, with the previously etched flexure region above the etchant solution, in order to etch the projection region of the fiber optic cable.

The etch system illustrated in FIG. 6B can be utilized to fabricate optical waveguide structures as illustrated by the second fiber optic cable in FIG. 1D. The end adjacent the fiber splice 160 can be etched by insertion and withdrawal from the etchant solution at a rate varied to produce increased etching as the fiber is withdrawn. Subsequently, the light delivery region 136 and the light emission tip 138 can be etched to form the desired tapered profile.

FIG. 6A is a simplified flowchart illustrating a method of fabricating a shaped fiber according to an embodiment of the present invention. The method illustrated in FIG. 6A utilizes a two-layer etch system as illustrated in FIG. 6B, but this is not required by the present invention and other configurations of etch systems can be utilized according to an embodiment of the present invention.

Referring to FIG. 6A, the method includes providing a fiber optic cable having a support region and an emission region (610) and providing an etch solution (612). The method also includes coating at least a portion of the emission with an etch resistant mask (614), inserting the support region into the etch solution (616), and etching a central portion of the support region (618). In an embodiment, the support region of the fiber is substantially the same diameter as the interior diameter of the motion actuator and the central portion of the support region is etched to form the flexure region while preserving the fiber diameter at portions of the support region that will make mechanical contact with the motion actuator.

The method further includes removing the coating on the emission region (620), inserting the emission region into the etch solution (622), and etching the emission region (624). In some embodiments, the support region is partially or entirely coated with an etch resistant coating before the emission region is etched. Etching of the emission region can form tapered profiles and the like.

Although a fiber optic cable is discussed in relation to FIG. 6A, the methods described herein are applicable to the fabrication of other optical waveguide structures and are the present invention is not limited to the fabrication of shaped fibers formed from fiber optic cables, but can include shaped optical waveguides fabricated from starting materials other than optical fibers.

It should be appreciated that the specific steps illustrated in FIG. 6A provide a particular method of fabricating a shaped fiber according to an embodiment of the present invention. Other sequences of steps may also be performed according to alternative embodiments. For example, alternative embodiments of the present invention may perform the steps outlined above in a different order. Moreover, the individual steps illustrated in FIG. 6A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6C:
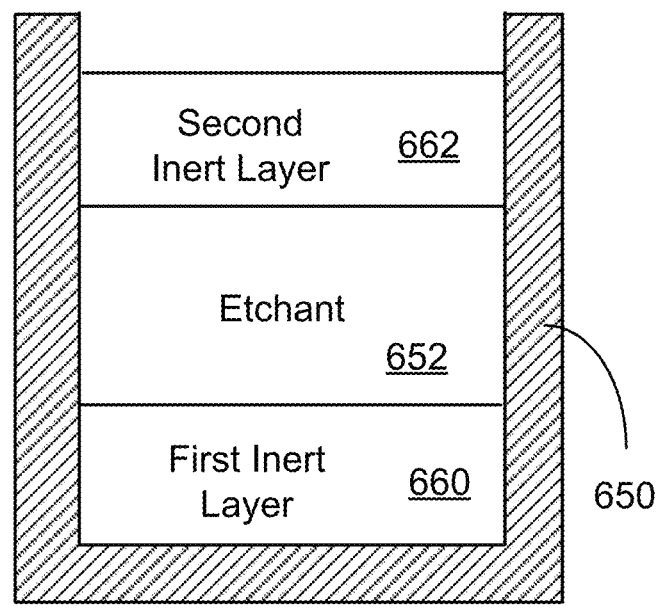
FIG. 6C illustrates an etch system according to an alternative embodiment of the present invention.
Figure 6D:
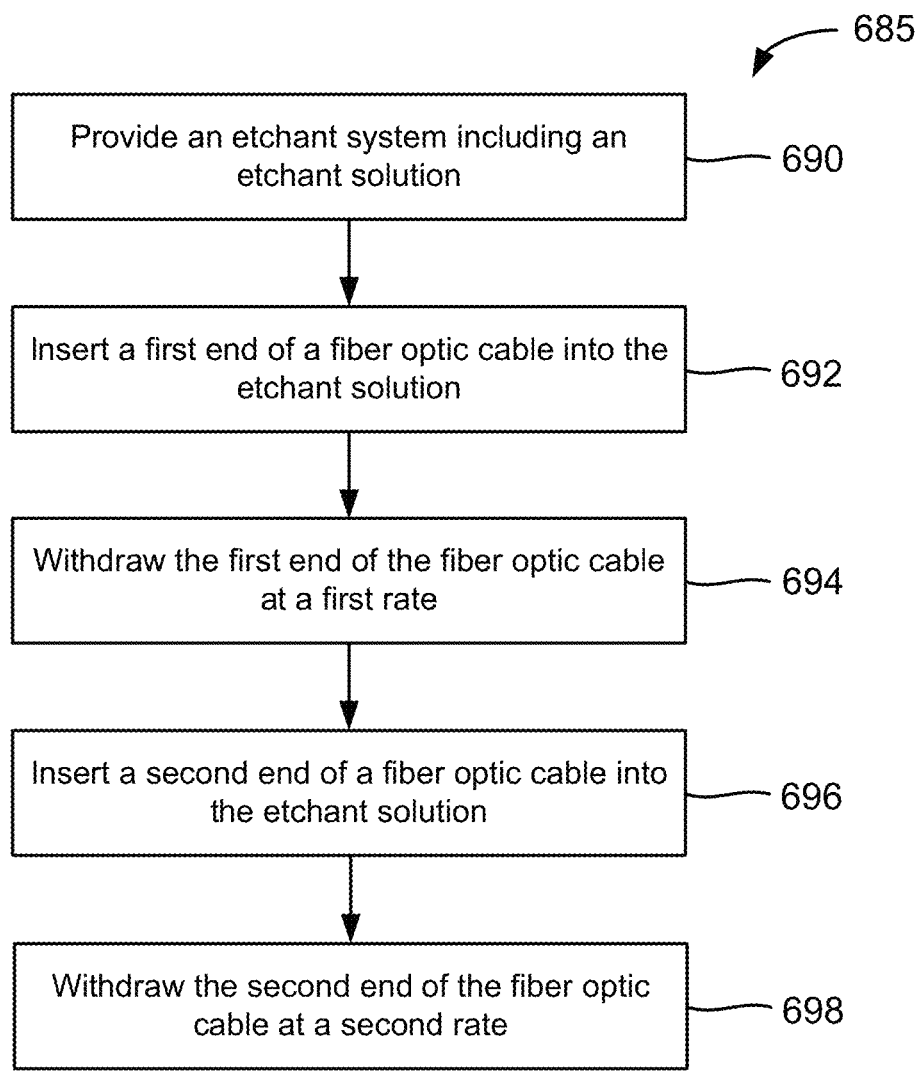
FIG. 6D is a simplified flowchart illustrating a method of fabricating an etched fiber waveguide according to an embodiment of the present invention.

FIG. 6D is a simplified flowchart illustrating a method of fabricating an etched fiber waveguide according to an embodiment of the present invention. The method 685 includes providing an etchant system including an etchant solution (690) and inserting a first end of a fiber optic cable into the etchant solution (692). The etchant solution can include HF acid. The method also includes withdrawing the first end of the fiber optic cable at a first rate (694). The first rate can vary as a function of time, for example, decreasing as a function of time to form a tapered structure that is thicker at the end processed near the end of the etch process. The decrease (or increase) in the first rate can be nonlinear or linear.

The method further includes inserting a second end of the fiber optic cable opposing the first end into the etchant solution (696) and withdrawing the second end of the fiber optic cable at a second rate (698). The second rate can vary as a function of time, for example, decreasing as a function of time. The decrease (or increase) in the second rate can be nonlinear or linear.

It should be appreciated that the specific steps illustrated in FIG. 6D provide a particular method of fabricating an etched fiber waveguide according to an embodiment of the present invention. Other sequences of steps may also be performed according to alternative embodiments. For example, alternative embodiments of the present invention may perform the steps outlined above in a different order. Moreover, the individual steps illustrated in FIG. 6D may include multiple sub-steps that may be performed in various sequences as appropriate to the individual step. Furthermore, additional steps may be added or removed depending on the particular applications. One of ordinary skill in the art would recognize many variations, modifications, and alternatives.

As illustrated in FIG. 6B, the etchant system can include an inert solution adjacent the etchant solution, for example floating above the etchant solution. In this case, the inert solution is less dense than the etchant solution, for example, isooctane as an inert solution for HF as the etchant solution. In some implementations, a central portion of the fiber optic cable disposed between the first end and the second end is not etched during the process illustrated in FIG. 6D and the first end and the second end can have different shaped profiles.

Some embodiments provide a lens on the tip of the fiber. The fiber shaping processes described herein can be utilized to form such a lens on fiber tip, for example, by masking the tip of the fiber and forming the desired shape for the other regions of the fiber. Then the other regions already completed can be masked, the mask on the tip removed, and the lens can be formed on the tip. In alterative embodiments, the order is reversed with the lens on the tip formed first and then the sides of the fiber shaped or sculpted subsequently. The lens can be fabricated as a hexagon lens or other suitable optical shapes. One of ordinary skill in the art would recognize many variations, modifications, and alternatives.

Referring to the structures shown in FIG. 1E, a benefit of utilizing a first optical waveguide, which can be a fiber optic cable, and a second optical waveguide, is that the second optical waveguide can be fabricated using the two-level etch system illustrated in FIG. 6B. The flexure region 142 of the second optical waveguide can be fabricated by etching in the etch system, preserving the dimensions of the support portion 140 and not etching the portion of the second optical waveguide that will become the delivery and emission sections. Subsequently, the right side of the second optical waveguide can be fabricated, for example, tapered as illustrated using the two-level etch system. Of course, the order could be reversed. After fabrication of the two ends, the second optical waveguide can be spliced to the first optical waveguide. Accordingly, this design simplifies the fabrication process in comparison to other techniques.

FIG. 6C illustrates an etch system according to an embodiment of the present invention. In the embodiment illustrated in FIG. 6C, a three-layer approach is utilized in which the etch-resistant container 650 is partially filled with a first inert material that is denser than the etchant solution and forms an inert layer 660, an etchant solution 652, and a second inert material that is less dense than the etchant solution and forms a second inert layer 662. As an example, using an HF-based etchant solution, an oil such as Krytox™ oil can be used as the first inert material and isooctane can be used as the second inert material. Using this three-layer etch system, only the portion of the fiber inserted into the etchant solution is etched, enabling structures similar to those illustrated in FIG. 1C to be fabricated in which a central portion of the fiber is etched (e.g., the flexure region) to form a lateral narrowing in the fiber optic cable in comparison with the ends surrounding the central portion. In some embodiments, portions of the fiber that are not to be etched can be masked off, for example both ends when the central portion is etched to supplement the protection provided by the inert layers.

Utilizing the three-layer etch system illustrated in FIG. 6C, a method of fabricating a shaped fiber can be provided. The method includes providing a fiber optic cable having a support region and an emission region and providing an etch solution. The etch solution includes a first inert layer, an etch layer adjacent the first inert layer, and a second inert layer adjacent the etch layer. The method also includes coating at least a portion of the emission region with an etch resistant mask, inserting the support region into the etch layer, and etching a central portion of the support region to form a flexure region disposed between sections of the support region and characterized by a thinner diameter than the sections of the support region. The method further includes removing the coating on at least a portion of the emission region, inserting the emission region into the etch layer, and etching the emission region to form a tapered profile.

The first inert layer can include isooctane and the etch layer can include HF acid. The second inert layer can include an inert material that is denser than the material in the etch layer. Referring to FIG. 1C, the portion of the fiber optic cable to the right of the coupling region can be masked to prevent etching of these regions during the etching of the flexure region. Similarly, after the flexure region has been etched, this region can be masked as needed while the projection region of the fiber optic cable is etched to form the desired tapered profile. Variations on this process are included within the scope of the present invention, including masking of additional regions, removal of portions of masked regions to facilitate etching, reversal of the order of processing, and the like.

It should be noted that although fiber optic cables are illustrated as the waveguide that is etched to form the shaped and/or tapered structures discussed herein, embodiments of the present invention are not limited to the etching of fiber optic cables. Other waveguide structures can be etched and shaped using the techniques described herein. One of ordinary skill in the art would recognize many variations, modifications, and alternatives.

During use of the etch systems described herein, for example, the two-layer etch system illustrated in FIG. 6B, the hydrophilic character of the fiber optic cable results in a meniscus forming at the interface between the etchant and the inert layer. As the fiber is withdrawn from the etchant (for example, at an increasing rate as a function of time to form a tapered profile in which the tip is etched more than the light delivery region), the etchant solution can thus adhere to the fiber at a level above the surface of the etchant present at the edges of the container 650. This wicking of the etchant solution in the vicinity of the fiber will be supported as the fiber is withdrawn until the height reaches a point at which the pull of gravity exceeds the surface tension. At this point, the etchant solution will collapse back down to the level defined by the surface of the etchant. The additional etching that occurs during the time that the meniscus adheres to the fiber can result in scalloping of the fiber as an overlay on the desired fiber shape.

Figure 6E:
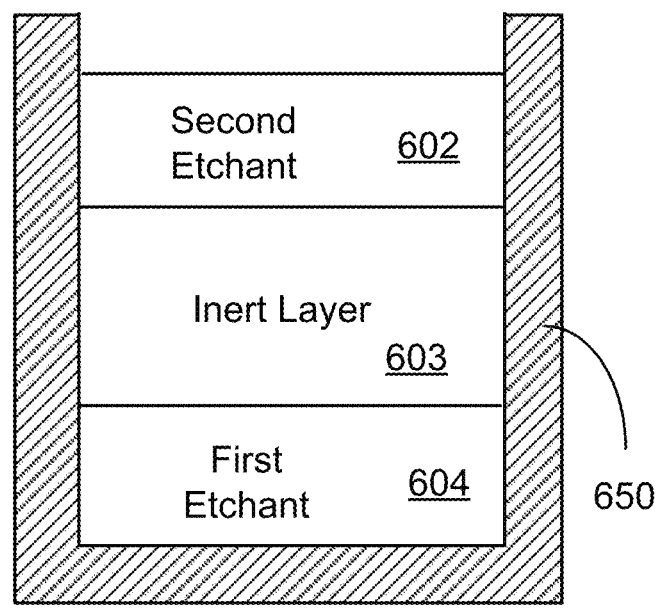
FIG. 6E illustrates an etch system according to a particular embodiment of the present invention.

FIG. 6E illustrates an etch system according to a particular embodiment of the present invention. In FIG. 6E, an alternative two-layer etch system is illustrated in which a first layer of etchant 604 and a second layer of etchant 602 are separated by an inert layer 603. The etchant and inert layers can share similarities with the etchant and inert layers described above. The etch system illustrated in FIG. 6E can be utilized to form structures similar to the shaped fiber including a flexure region illustrated in FIB 1B. In this example, a shaped fiber could be formed by first inserting the fiber into the bath illustrated in FIG. 6E, thereby etching the ends of the fiber while preserving the original dimensions of the centrally located support portion 140. After formation of the flexure region and the initial shaping of the emission end of the fiber, the fiber can be immersed in an etch system as shown in FIG. 6B to further taper the emission end of the fiber. Thus, using a combination of the etch systems described herein, components can be fabricated by the use of vertical insertions into a set of one or more linearly staged etch systems (e.g., etch baths) as an alternative to methods in which the fiber optic cable is insert and removed, rotated, and subsequently reinserted. Accordingly, it will be appreciated that combinations of the etch systems described herein can be utilized to fabricate components with the desired shapes. One of ordinary skill in the art would recognize many variations, modifications, and alternatives.

Figure 7:
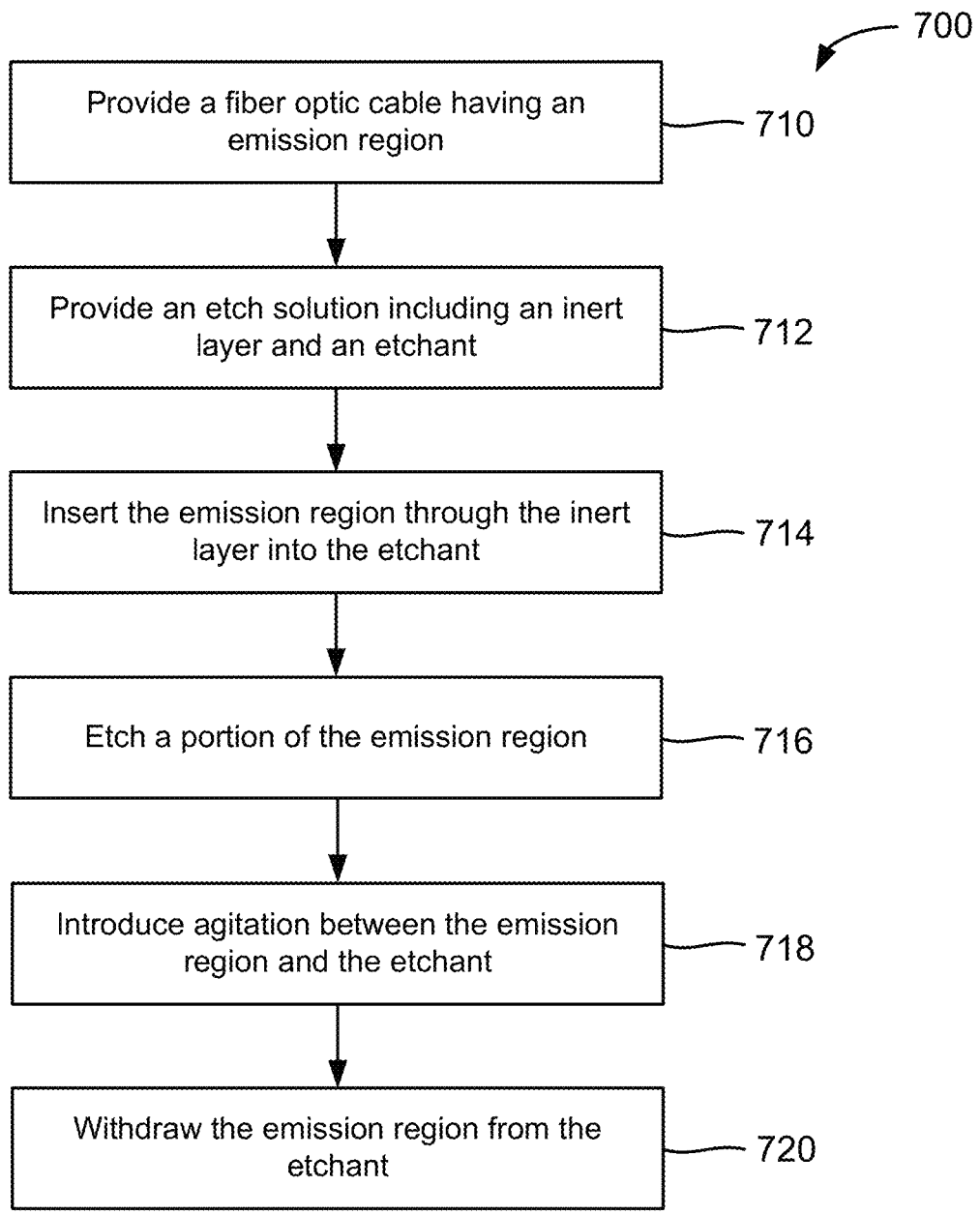
FIG. 7 is a simplified flowchart illustrating a method of fabricating a tapered fiber emission tip according to an embodiment of the present invention.

FIG. 7 is a simplified flowchart illustrating a method of fabricating a tapered fiber emission tip according to an embodiment of the present invention. The method illustrated in FIG. 7 reduces or prevents the scalloping of the sides of the fiber as described above. The method 700 of fabricating a tapered fiber emission tip includes providing a fiber optic cable having an emission region (710) and providing an etch solution including an inert layer and an etchant (712). The etchant can also be referred to as an etchant layer. The method also includes inserting the emission region through the inert layer into the etchant (714) and etching a portion of the emission region (716).

In order to prevent undesired scalloping of the sides of the fiber, the method includes introducing agitation between the emission region and the etchant (718) as the emission region is withdrawn from the etchant (720). The introduction of agitation can be implemented by agitation of the etch system including the etchant and the inert layer. In other implementations, introducing agitation can be accomplished by agitation of the fiber optic cable with respect to the etch system. In these implementations, the fiber optic cable can be moved laterally to introduce lateral agitation. The lateral agitation can be random, semi-random, or the like. Such randomization can prevents standing waves that could be undesirable. The agitation and the resulting solution surface shape can be controlled to provide the desired fiber shape.

In other embodiments, the agitation of the fiber optic cable can be accomplished by introducing longitudinal agitation of the fiber optic cable. Moreover, in addition to these methods, agitation of the fiber optic cable can be accomplished by rotation of the fiber optic cable. The various methods described herein can be combined, for example, performing both agitation of the etch system and agitation of the fiber optic cable, either laterally, longitudinally, or in combination.

Although the method illustrated in FIG. 7 has been discussed in relation to the fabrication of a tapered fiber emission tip, the present invention is not limited to this particular structure and is applicable to other portions of the fibers and optical waveguides discussed herein, including the flexure region, which can have a constant diameter over a predetermined longitudinal extent. In this case, reduction in or prevention of scalloping will preserve the desired constant diameter. It should be appreciated that the specific steps illustrated in FIG. 7 provide a particular method of fabricating a tapered fiber emission tip according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
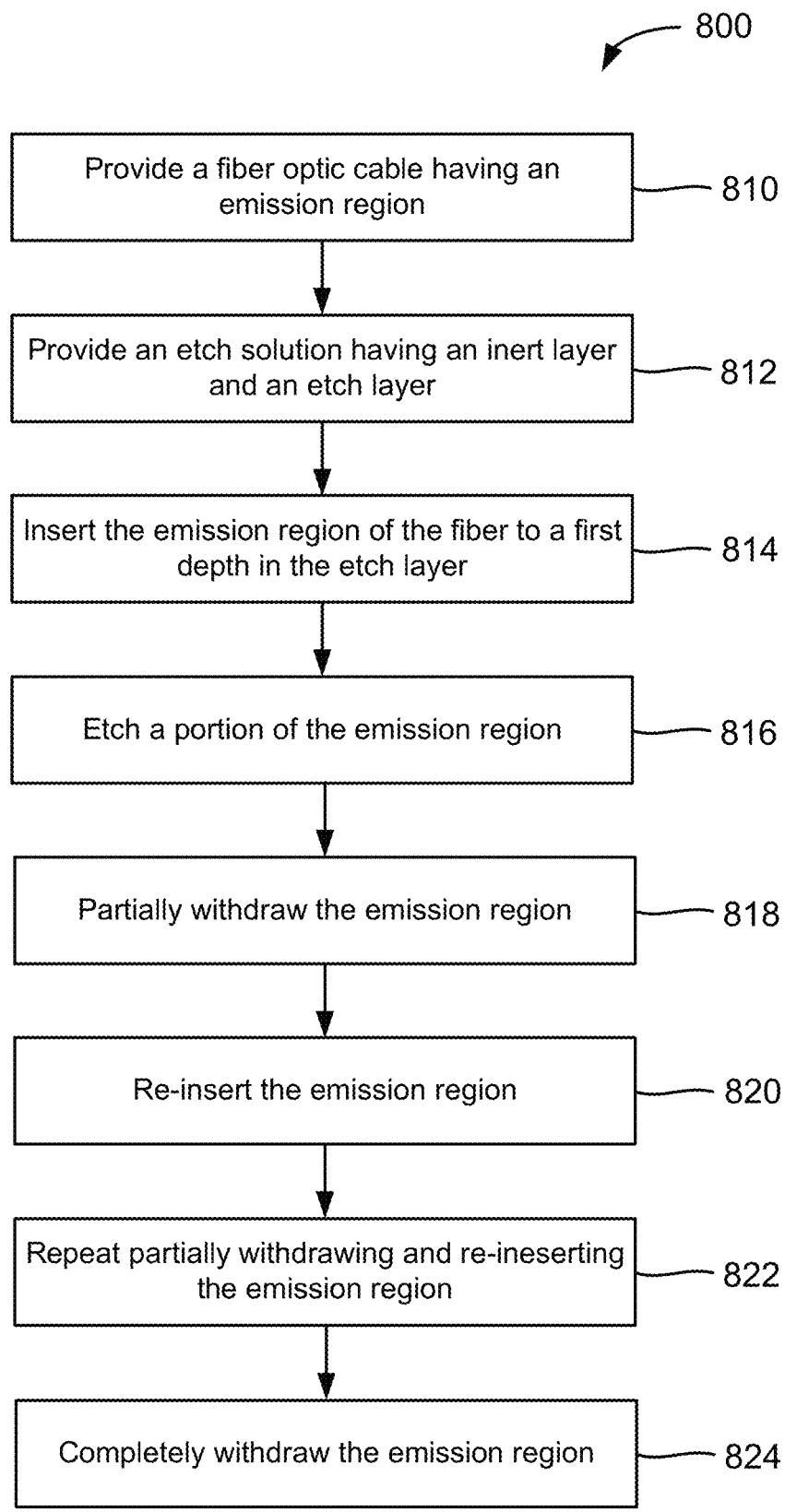
FIG. 8 is a simplified flowchart illustrating a method of fabricating a tapered fiber emission tip according to another embodiment of the present invention.

FIG. 8 is a simplified flowchart illustrating a method of fabricating a tapered fiber emission tip according to another embodiment of the present invention. As discussed above, although FIG. 8 is discussed in relation to the fabrication of a tapered fiber emission tip, the present invention is not limited to this particular structure and is applicable to other portions of the fibers and optical waveguides discussed herein, including the flexure region and other regions. In this method, which provides an alternative to methods in which the fiber is immersed and withdrawn from the etchant completely at a predetermined rate, which can vary as a function of time, the fiber is immersed in the etchant to a first predetermined depth, completely withdrawn, and then re-immersed to a second predetermined depth. The withdrawal process can break the meniscus that forms on the fiber as discussed above.

Referring to FIG. 8, the method 800 of fabricating a tapered fiber emission tip includes providing a fiber optic cable having an emission region (810) and providing an etch solution including an inert layer and an etch layer (812). Thus, in this method, the etchant 652 illustrated in FIG. 6 is referred to as an etch layer. The method also includes inserting the emission region through the inert layer to a first depth in the etch layer (814) and etching a portion of the emission region (816). The method further includes at least partially withdrawing the emission region from the etch layer (818) to break the surface tension of the etchant and re-inserting the emission region through the inert layer to a subsequent depth in the etch layer less than the first depth (820).

The process of at least partially withdrawing the emission region and re-inserting the emission region is repeated a predetermined number of times (822), effectively accomplishing a gradual and complete withdrawal of the emission region from the etch layer (824). In an embodiment, the subsequent depth is gradually decreased during the repetition of the withdrawal and re-inserting processes.

It should be appreciated that the specific steps illustrated in FIG. 8 provide a particular method of fabricating a tapered fiber emission tip according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
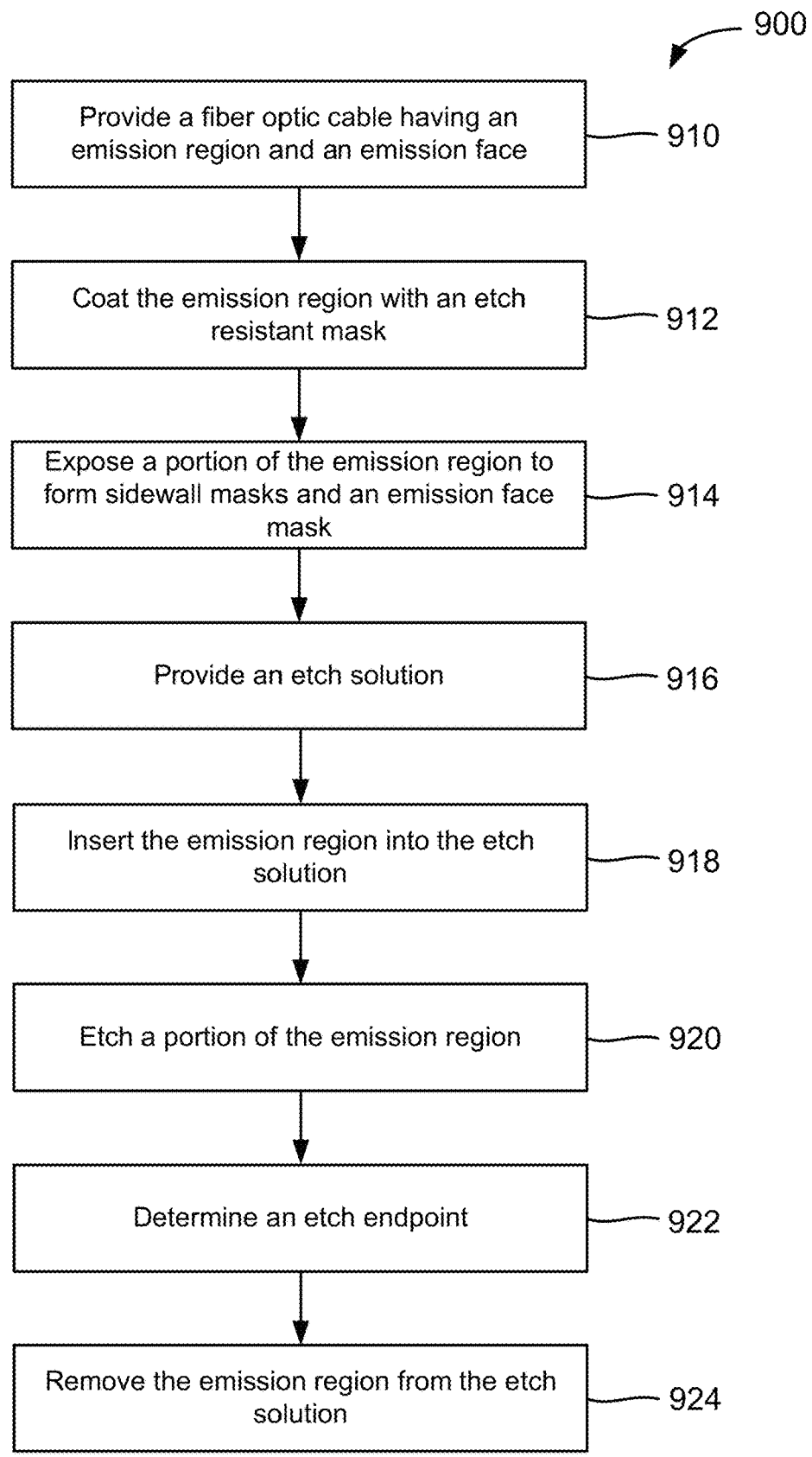
FIG. 9 is a simplified flowchart illustrating a method of fabricating a shaped fiber using an etch process according to an embodiment of the present invention.

FIG. 9 is a simplified flowchart illustrating a method of fabricating a shaped fiber using an etch process according to an embodiment of the present invention. FIGS. 10A-10D are simplified side views illustrating processing of a fiber in accordance with the method provided in relation to FIG. 9.

Figure 10A:
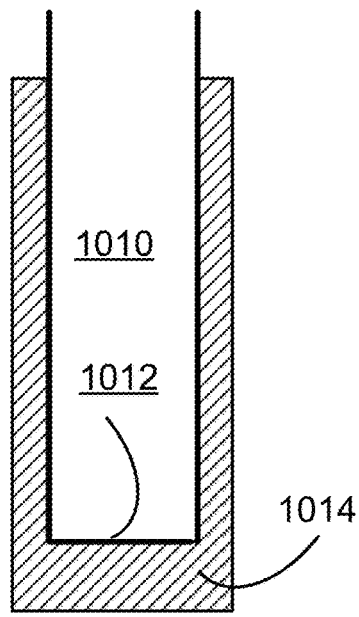
FIGS. 10A-10D are simplified side views illustrating processing of a fiber in accordance with the method provided in relation to FIG. 9.
Figure 10B:
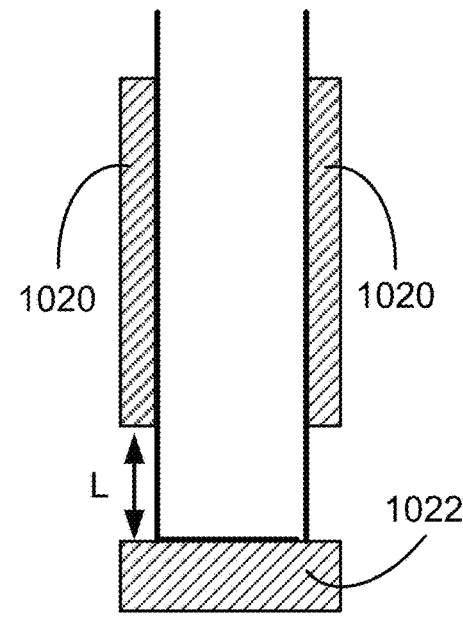

Referring to FIG. 9, the method 900 includes providing a fiber optic cable having an emission region and an emission face (910), coating the emission region with an etch resistant mask (912), and exposing a portion of the emission region adjacent the emission face to form sidewall mask and an emission face mask (914). Referring to FIG. 10A, the fiber optic cable has an emission region 1010 and an emission face 1012. The emission region 1010 and the emission face 1012 of the fiber optic cable are coated with an etch resistant mask 1014. Thus, the mask is illustrated as coating both the end and sides of the fiber. Referring to FIG. 10B, after exposure of a portion of the emission region adjacent the emission face, the exposed portion is removed to form the sidewall mask 1020 and the emission face mask 1022. The portion of the fiber not covered by the masks can then be etched as described below.

The spatial separation between the sidewall mask 1020 and the emission face mask 1022 is illustrated as L in FIG. 10B and can be used to control the shape of the etched profile. For small separations, the etchant is effectively wicked under the masks, whereas for larger separations, the sides of the fiber are etched significantly. By selecting the spatial separation, control of the curvature of the fiber tip is provided by some embodiments.

Figure 10C:
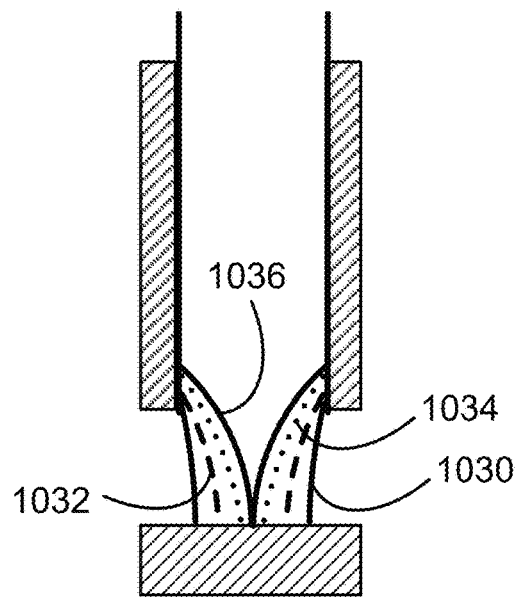
Figure 10D:
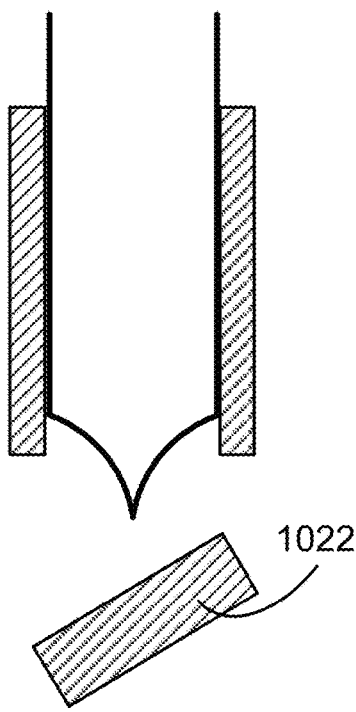

The method also includes providing an etch solution (916), inserting the emission region into the etch solution (918), and etching a portion of the emission region to form successively deeper etch profiles (920). Referring to FIG. 10C, four subsequent etch profiles 1030, 1032, 1034, and 1036 are illustrated by solid, dashed, dotted, and solid lines, respectively. As the etching process proceeds, the etchant wicks under the sidewall mask in the process illustrated, extending the etch as illustrated, but this is not required by the present invention. The method further includes determining an etch endpoint (922) and removing the emission region from the etch solution (924). As illustrated in FIG. 10D, in some embodiments, determining an etch endpoint includes detecting separation between the emission face of the fiber, now reduced to a point, and the emission face mask 1022. As an example, a machine vision system could monitor the emission face mask and provide an endpoint detection functionality.

It should be appreciated that the specific steps illustrated in FIG. 9 provide a particular method of fabricating a shaped fiber using an etch process according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In various embodiments, the mask dimensions and materials enable variation in etch profiles to create many endpoint shapes. As an example, depending on the etch chemistry, etchant can wick in between the emission face and the emission face mask to form a convex lens on the end of the fiber. Moreover, although the example illustrated in FIGS. 10A-10D are rotationally symmetric, the present invention is not limited to this example and other mask shapes, for example apertures on opposing sides, can be used to enable the creation of cylindrical lens elements. Moreover, discrete apertures of various sizes, orientations, and the like can be utilized, providing ports for etchant inflow that can form profiles of arbitrary shape. One of ordinary skill in the art would recognize many variations, modifications, and alternatives.

In addition to the process illustrated in relation to FIGS. 10A-10D, multi-step processes are included within the scope of the present invention. As an example, a first set of one or more etch resistant masks could be applied, a first etching process could be performed, and subsequent mask(s) could be applied followed by subsequent etching processes.

Accordingly, multiple etch processes, each used to create different etch profiles, can be combined to fabricate profiles of the desired shape. Thus, various combinations of successive masking and etching processes are included within the scope of the present invention. As another example, a first masking design could be utilized to produce a first shaped profile at the end of the fiber. A second, different emission face mask could then be applied at a different orientation to etch an alternative shape at the end of the fiber. Using photolithographic processes, high levels of control can be applied to the masks, enabling high levels of control for the etch profiles. As an example, although the emission face mask 1020 has a diameter larger than the emission face, thereby covering the entire face, this is not required and different emission face masks, some covering the entire face and others only covering a portion of the face can be utilized in single step or multi-step etching processes. Moreover, the thicknesses of the masks as well their coverage areas are controllable according to embodiments of the present invention.

In some embodiments, rather than masking the end of the fiber, the sides can be masked with a jacket and the end exposed to allow wicking of the etchant under the jacket to form a shaped tip on the fiber. The shaped tip can be formed as a conical structure, a hexagonal lens, or the like.

Figure 10E:
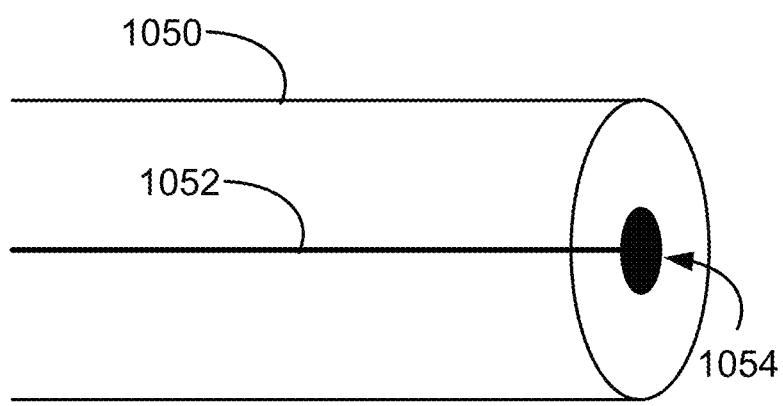
FIG. 10E is a simplified perspective view illustrating a fiber with a protective cover according to an embodiment of the present invention.

FIG. 10E is a simplified perspective view illustrating a fiber with a protective cover according to an embodiment of the present invention. As will be evident to one of skill in the art, the waveguiding properties of optical fibers results from the different index of refraction associated with the different materials utilized for the core and cladding of the fiber. As an example, for a fiber with a cladding of fused silica and a doped fused silica core, thereby providing a different refractive index, the core/clad interface is susceptible to ingress by the etchant (e.g., an HF-based etchant) and the etchant can wick along either the interface or into the core and preferentially etch the core. Additionally, etch rates for the core and the clad may be different, so the core may etch more quickly than the cladding.

Accordingly, embodiments of the present invention protect the core with a protective cover to prevent this core etching. The protective cover can cover the entire end or only a portion of the end. Referring to FIG. 10E, the fiber 1050 includes core 1052. Protective cover 1054 is formed on the end of the fiber to protect the core from preferential etching during etch processing.

Figure 11A:
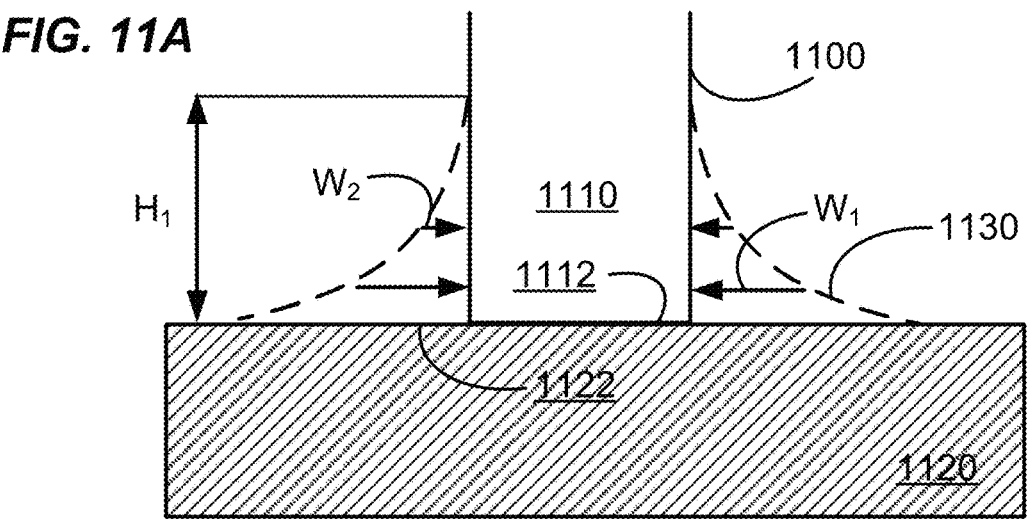
FIGS. 11A-11C are simplified side views illustrating a method of fabricating a shaped fiber tip according to an embodiment of the present invention.
Figure 11B:
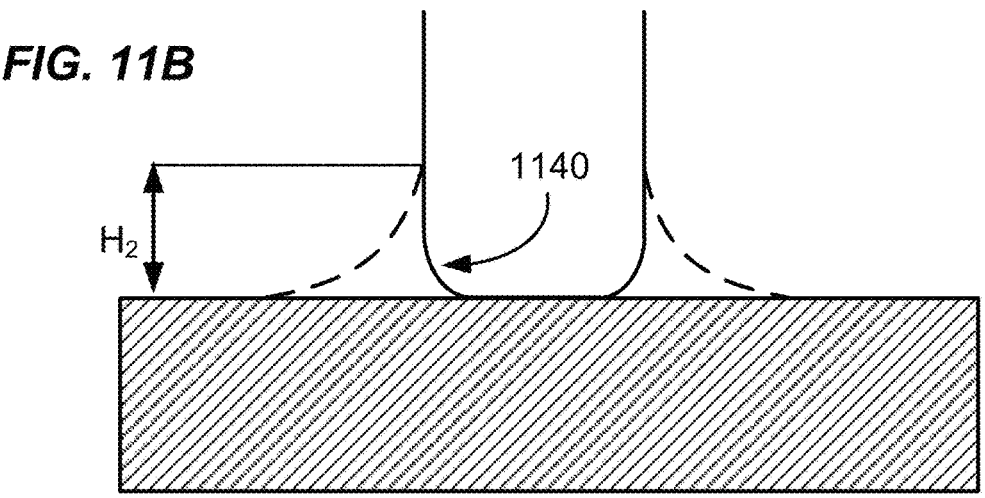
Figure 11C:
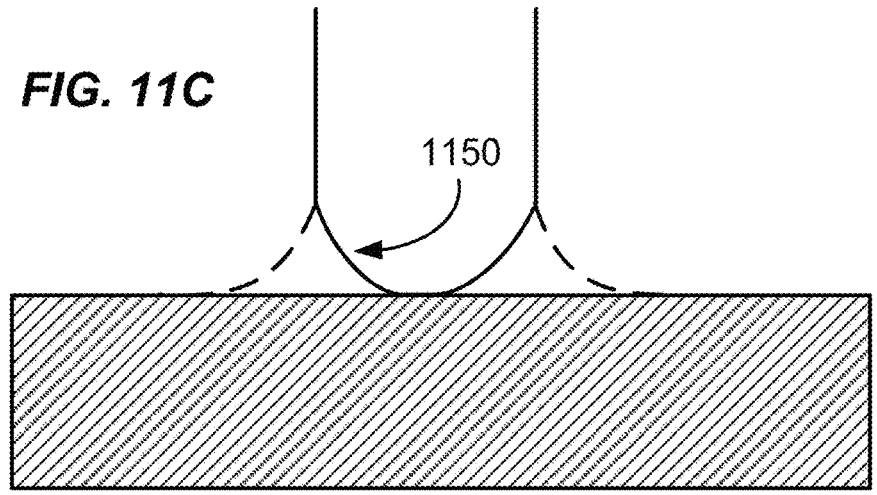

FIGS. 11A-11C are simplified side views illustrating a method of fabricating a shaped fiber tip according to an embodiment of the present invention. As described in relation to FIGS. 11A-11C, the meniscus forming characteristics of the interface between the etchant and the inert layer, discussed above in relation to FIG. 6B, can be utilized to form a lens on the tip of the fiber. Referring to FIGS. 11A-11C, a method of fabricating a lens on an optical fiber tip is provided. The method includes providing a fiber optic cable 1100 having an emission region 1110 and an emission face 1112. An etch solution 1120 having a surface 1122 is provided and the emission face is positioned to make contact with the surface 1122 of the etch solution as illustrated in FIG. 11A. In the embodiment illustrated in FIG. 11A, the emission face does not extend below the surface 1122 and the hydrophilic characteristic of the fiber results in wicking of etchant up the side of the fiber, but in other embodiments, the fiber is positioned such that the emission face does extend below the surface.

Due to the wicking of the etch solution up the sides of the fiber, a meniscus 1130 is formed by the etch solution surrounding the emission region 1110. The meniscus 1130 is characterized by a greater width ($w_1$) adjacent the emission face 1112 than the width ($w_2$) at positions farther from the emission face. The meniscus can also be characterized by an initial height (H).

The presence of the etchant solution in the meniscus will result in etching of the emission region to form an initial etch profile 1140 as illustrated in FIG. 11B. The greater amount of etchant present adjacent the emission face will result in a higher etching rate adjacent the emission face, with lower etching rates at the top of the meniscus. Accordingly, the etching process will remove more material adjacent the fiber/etchant interface, resulting in the initial etch profile 1140 illustrated in FIG. 11B in which a convex feature is formed.

Because of the formation of the initial etch profile, the surface tension changes produce a subsequent meniscus that is decreased in height ($H_2$) to a value less than the initial height ($H_1$). As the meniscus height decreases, the etching process will continue to form subsequent etch profiles 1150 as illustrated in FIG. 11C. As the etchant wicks up the sides of the fiber to a lesser extent, thereby varying the etch rate as a function of meniscus height, the etch process will form a curved lens on the fiber tip. In some implementations, the process illustrated in FIGS. 11A-11C will be a self-limiting process as meniscus decreases in height until the emission face no longer makes contact with the surface of the etchant. As a result, the method and system described in relation to FIGS. 11A-11C provides reproducibility since the height of the meniscus changes as the etch proceeds in a self-limiting manner.

In addition to formation of lensed fiber tips, the method illustrated in relation to FIGS. 11A-11C can also be applied to other etching processes discussed herein to form desired profiles by control of the fiber position adjacent the etchant. Moreover, embodiments of the present invention include methods and systems in which a first fiber shaping process is utilized to form a lens on the fiber tip, an etch resistant mask is used to protect the fabricated tip, and one or more subsequent fiber shaping processes are utilized to form other regions of the shaped fiber, for example, the tapered delivery region, the flexure region, or the like. As will be evident to one of skill in the art, the order could be reversed. An advantage of processing the tip first will be the uniformity and size of the fiber during initial processing. An advantage of processing the tip last will be the ability to protect the tip until it is processed, which can involve more delicate processing steps. Depending on the particular application, one or more of these advantages may be available. One of ordinary skill in the art would recognize many variations, modifications, and alternatives.

Figure 12:
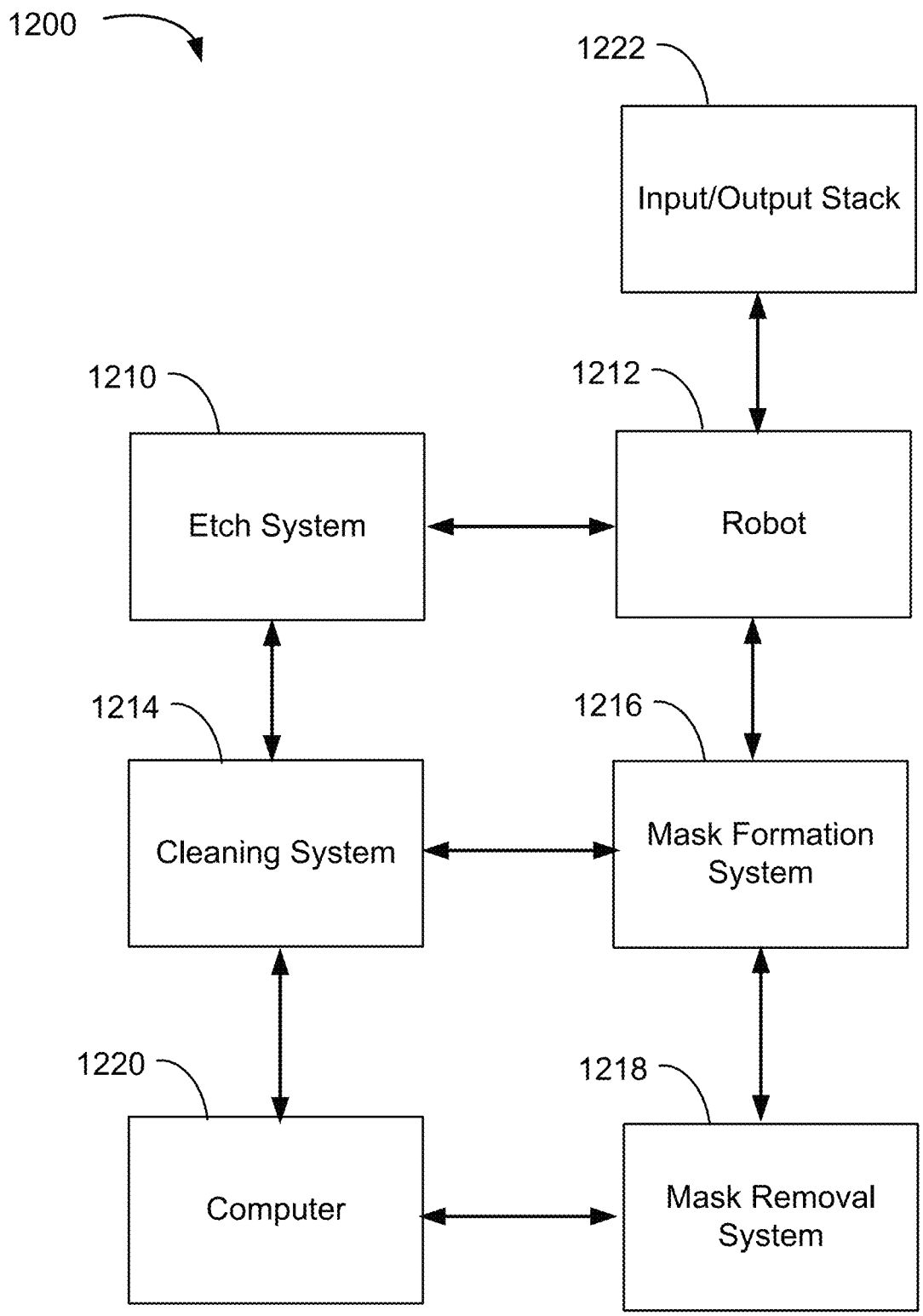
FIG. 12 is a simplified schematic diagram illustrating a waveguide fabrication system according to an embodiment of the present invention.

FIG. 12 is a simplified schematic diagram illustrating a waveguide fabrication system 1200 according to an embodiment of the present invention. As illustrated in FIG. 12, an etch system 1210 is provided that can work in conjunction with robot 1212, cleaning system 1214, masking formation system 1216, and mask removal system 1218. System control is provided by computer 1220, which can include one or more processors, memory, and an input/output interface operable to communicate with the other illustrated systems. The etch system 1210 can be a multi-tank system utilizing different etchant solutions as appropriate to the particular materials that are to be etched. For example, a first tank could include an HF-based etchant to etch glass and a second tank could include an $H_2SO_4$-based etchant to etch mask materials in conjunction with or in place of the mask removal system 1218. Sealed tanks in the form of chambers can also be used. The cleaning system 1214 can be integrated with the mask removal system 1218 in some embodiments and can be used to clean the optical elements and prepare them for additional processing or after processing. As will be evident to one of skill in the art, the various systems illustrated in FIG. 12 can be combined into compound system elements including one or more of the systems illustrated in FIG. 12.

Fiber optic cables or other suitable waveguide structures provided in input/output stack 1222 can be picked up by robot 1212, partially masked using mask formation system 1216, and then a portion of the waveguide structures can be etched using etch system 1210. Tapered profiles can be fabricated as discussed herein. After the etching process, the cleaning system 1214 and/or the mask removal system 1218 (for example, using a sulfuric acid bath) can be utilized to remove the mask and prepare the waveguide structure for further processing.

Using the robot to translate the waveguide structure between the various systems under control of the computer 1220, different portions or the same portions of the waveguide structure can be masked and etched, with the processes repeating until the desired structure is fabricated. Upon completion of the fabrication process, the completed structure can be moved to the output section of the input/output stack 1222 for future use, including packaging as an element of a motion actuation system.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A fiber optic element of a fiber scanning system, the fiber optic element comprising:
   a fiber optic cable having:
      an input region;
      a support region coupled to the input region; and
      a light emission tip, wherein the support region is characterized by a first diameter and the light emission tip is characterized by a second diameter less than the first diameter, wherein the input region is located further from the light emission tip than the support region; and
   a motion actuator having:
      longitudinal side members;
      an internal orifice disposed between the longitudinal side members;
      a first region disposed at one end of the motion actuator;
      a central region; and
      a second region disposed at an opposing end of the motion actuator;
   wherein the support region of the fiber optic cable is disposed in the second region of the motion actuator,
   wherein the input region of the fiber optic cable is disposed within the longitudinal side members and separated from the longitudinal side members by a flexure distance.

2. The fiber optic element of claim 1 wherein the fiber optic cable tapers from the support region to the light emission tip.

3. The fiber optic element of claim 1 wherein the input region is disposed in the central region of the motion actuator.

4. The fiber optic element of claim 1 wherein the support region of the fiber optic cable is in mechanical contact with second region of the motion actuator.

5. The fiber optic element of claim 1 wherein:
   the fiber optic cable further comprises a second support region coupled to the input region; and
   the second support region is disposed between the first region of the motion actuator.

6. The fiber optic element of claim 5 wherein:
   the support region of the fiber optic cable is in mechanical contact with second region of the motion actuator; and
   the second support region of the fiber optic cable is in mechanical contact with the first region of the motion actuator.

7. The fiber optic element of claim 5 wherein the input region is characterized by a third diameter less than the first diameter, and the second support region is characterized by a fourth diameter greater than the third diameter.

8. The fiber optic element of claim 5 wherein the second support region is characterized by the first diameter.

9. The fiber optic element of claim 1 wherein:
   the motion actuator comprises a piezoelectric actuator; and
   the longitudinal side members comprises a first piezoelectric element operable to contract/expand and a second piezoelectric element operable to expand/contract in opposition to the first piezoelectric element.

10. The fiber optic element of claim 1 wherein the internal orifice of the motion actuator is characterized by a cylindrical profile defined by an internal diameter and the support region is characterized by an outside diameter substantially equal to the internal diameter.

11. The fiber optic element of claim 10 wherein:
   the fiber optic cable further comprises a second support region coupled to the input region;
   the second support region is disposed between the first region of the motion actuator; and
   the second support region is characterized by an outside diameter substantially equal to the internal diameter.

12. The fiber optic element of claim 1 wherein the input region is characterized by a third diameter less than the first diameter.

13. The fiber optic element of claim 1 wherein the input region is disposed in the first region of the motion actuator.

* * * * *